(12) United States Patent
Cullen, III

(10) Patent No.: US 7,698,146 B2
(45) Date of Patent: Apr. 13, 2010

(54) SYSTEM AND METHOD FOR COLLECTING AND PROVIDING RESOURCE RATE INFORMATION USING RESOURCE PROFILING

(75) Inventor: Andrew A. Cullen, III, Succasunna, NJ (US)

(73) Assignee: Volt Information Sciences Inc., New York, NY (US)

( * ) Notice: Subject to any disclaimer, the term of this patent is extended or adjusted under 35 U.S.C. 154(b) by 1280 days.

(21) Appl. No.: 10/128,751

(22) Filed: Apr. 24, 2002

(65) Prior Publication Data

US 2003/0204439 A1    Oct. 30, 2003

(51) Int. Cl.
*G06Q 10/00* (2006.01)
(52) U.S. Cl. ............................................ 705/1; 705/11
(58) Field of Classification Search .................. 705/8, 705/10, 1, 11
See application file for complete search history.

(56) References Cited

U.S. PATENT DOCUMENTS

| | | | |
|---|---|---|---|
| 4,799,156 A | 1/1989 | Shavit et al. | |
| 4,937,743 A | 6/1990 | Rassman et al. | |
| 4,992,940 A | 2/1991 | Dworkin | |
| 5,117,353 A | 5/1992 | Stipanovich et al. | |
| 5,164,897 A | 11/1992 | Clark et al. | |
| 5,291,397 A | 3/1994 | Powell | |
| 5,381,332 A | 1/1995 | Wood | |
| 5,416,694 A | 5/1995 | Parrish et al. | |
| 5,493,490 A | 2/1996 | Johnson | |
| 5,592,375 A | 1/1997 | Salmon et al. | |
| 5,600,554 A | 2/1997 | Williams | |
| 5,664,115 A | 9/1997 | Fraser | 705/37 |
| 5,715,402 A | 2/1998 | Popolo | |
| 5,758,328 A | 5/1998 | Giovannoli | |
| 5,794,212 A | 8/1998 | Mistr, Jr. | 705/26 |
| 5,802,493 A | 9/1998 | Sheflott et al. | 705/1 |
| 5,842,178 A | 11/1998 | Giovannoli | 705/26 |
| 5,907,490 A | 5/1999 | Oliver | |

(Continued)

FOREIGN PATENT DOCUMENTS

| WO | WO-/00/50970 | 8/2000 |
|---|---|---|
| WO | WO-01/48656 | 7/2001 |
| WO | WO-02/08868 | 1/2002 |
| WO | WO-02/25544 | 3/2002 |

OTHER PUBLICATIONS

"nextSource Announces Launch of its Multiple Listing Staffing Association." Business Wire, p. 2196, Apr. 16, 2002.*

(Continued)

*Primary Examiner*—Susanna M Diaz
(74) *Attorney, Agent, or Firm*—Winstead PC

(57) ABSTRACT

A computer system and method is disclosed for collecting resource rate information associated with a plurality of resource profiles and providing resource rate statistical data for a specific resource profile via a web-based interface. Each resource profile is defined from hierarchical profile selections to identify a job category, and each job category has one or more skills associated therewith. A database maintains the resource profiles and associated resource rate information. The resource rate information is collected from a variety of sources, including business entities that interface with the database to upload actual resource rate information (e.g., actual salaries, wage rates and other compensation information) for one or more resource profiles associated with the business entity.

35 Claims, 30 Drawing Sheets

U.S. PATENT DOCUMENTS

| | | | |
|---|---|---|---|
| 5,913,202 A | 6/1999 | Motoyama | 705/35 |
| 5,915,086 A | 6/1999 | Buzsaki et al. | |
| 5,960,407 A * | 9/1999 | Vivona | 705/10 |
| 5,970,475 A | 10/1999 | Barnes et al. | |
| 5,978,768 A | 11/1999 | McGovern et al. | |
| 5,987,464 A | 11/1999 | Schneider | |
| 5,991,735 A | 11/1999 | Gerace | |
| 5,995,951 A | 11/1999 | Ferguson | 706/10 |
| 6,014,644 A | 1/2000 | Erickson | 705/37 |
| 6,038,547 A | 3/2000 | Casto | |
| 6,041,303 A | 3/2000 | Mathews | 705/1 |
| 6,049,776 A | 4/2000 | Donnelly et al. | 705/8 |
| 6,058,373 A | 5/2000 | Blinn et al. | |
| 6,058,379 A | 5/2000 | Odom et al. | 705/37 |
| 6,070,143 A * | 5/2000 | Barney et al. | 705/8 |
| 6,088,678 A | 7/2000 | Shannon | 705/8 |
| 6,092,050 A | 7/2000 | Lungren et al. | 705/10 |
| 6,092,197 A | 7/2000 | Coueignoux | |
| 6,112,189 A | 8/2000 | Rickard et al. | 705/37 |
| 6,115,642 A | 9/2000 | Brown et al. | 700/104 |
| 6,131,087 A | 10/2000 | Luke et al. | 705/26 |
| 6,141,653 A | 10/2000 | Conklin et al. | 705/80 |
| 6,157,808 A | 12/2000 | Hollingsworth | |
| 6,161,099 A | 12/2000 | Harrington et al. | 705/37 |
| 6,189,003 B1 | 2/2001 | Leal | |
| 6,199,050 B1 | 3/2001 | Alaia et al. | 705/37 |
| 6,266,659 B1 | 7/2001 | Nadkarni | 707/3 |
| 6,272,467 B1 | 8/2001 | Durand et al. | 705/1 |
| 6,275,812 B1 | 8/2001 | Haq et al. | 705/11 |
| 6,289,340 B1 | 9/2001 | Puram et al. | 707/5 |
| 6,302,695 B1 | 10/2001 | Rtischev et al. | |
| 6,324,522 B2 | 11/2001 | Peterson et al. | |
| 6,349,238 B1 | 2/2002 | Gabbita et al. | |
| 6,356,909 B1 | 3/2002 | Spencer | |
| 6,370,510 B1 | 4/2002 | McGovern et al. | |
| 6,385,620 B1 | 5/2002 | Kurzius et al. | |
| 6,408,337 B1 | 6/2002 | Dietz et al. | |
| 6,442,528 B1 | 8/2002 | Notani et al. | |
| 6,480,857 B1 | 11/2002 | Chandler | |
| 6,529,909 B1 | 3/2003 | Bowman-Amuah | |
| 6,556,976 B1 | 4/2003 | Callen | |
| 6,647,300 B1 | 11/2003 | Balasubramanian et al. | |
| 6,658,400 B2 | 12/2003 | Perell et al. | |
| 7,054,821 B1 * | 5/2006 | Rosenthal et al. | 705/1 |
| 7,089,203 B1 | 8/2006 | Crookshanks | |
| 7,107,268 B1 | 9/2006 | Zawadzki et al. | |
| 7,275,039 B2 | 9/2007 | Setteducati | |
| 7,305,392 B1 | 12/2007 | Abrams et al. | |
| 7,386,475 B2 | 6/2008 | Parasnis et al. | |
| 7,430,523 B1 | 9/2008 | Khalidi | |
| 7,437,304 B2 | 10/2008 | Barnard et al. | |
| 7,457,764 B1 | 11/2008 | Bullock et al. | |
| 7,533,033 B1 | 5/2009 | Unite et al. | |
| 2001/0044768 A1 | 11/2001 | Wares | |
| 2001/0051913 A1 | 12/2001 | Vashistha et al. | |
| 2002/0002479 A1 * | 1/2002 | Almog et al. | 705/8 |
| 2002/0046147 A1 | 4/2002 | Livesay et al. | |
| 2002/0072946 A1 | 6/2002 | Richardson | |
| 2002/0073082 A1 | 6/2002 | Duvillier et al. | |
| 2002/0087382 A1 | 7/2002 | Tiburcio | |
| 2002/0103687 A1 | 8/2002 | Kipling | |
| 2002/0152133 A1 | 10/2002 | King et al. | |
| 2002/0161619 A1 | 10/2002 | Ham et al. | |
| 2002/0198766 A1 | 12/2002 | Magrino et al. | |
| 2003/0004850 A1 | 1/2003 | Li et al. | |
| 2003/0018481 A1 | 1/2003 | Zhou et al. | |
| 2003/0055694 A1 | 3/2003 | Menninger | |
| 2003/0055754 A1 | 3/2003 | Sullivan | |
| 2003/0083910 A1 | 5/2003 | Sayal et al. | |
| 2003/0101114 A1 | 5/2003 | Delapass et al. | |
| 2003/0101127 A1 | 5/2003 | Cornelius | |
| 2003/0135401 A1 | 7/2003 | Parr | |
| 2003/0145006 A1 | 7/2003 | Dalfsen et al. | |
| 2003/0177051 A1 | 9/2003 | Driscoll et al. | |
| 2003/0200150 A1 | 10/2003 | Westcott et al. | |
| 2003/0200168 A1 | 10/2003 | Cullen, III et al. | |
| 2003/0208434 A1 | 11/2003 | Posner | |
| 2003/0212604 A1 | 11/2003 | Cullen, III | |
| 2003/0216986 A1 | 11/2003 | Hassan | |
| 2004/0030566 A1 * | 2/2004 | Brooks Rix | 705/1 |
| 2004/0030590 A1 | 2/2004 | Swan et al. | |
| 2004/0039681 A1 | 2/2004 | Cullen, III et al. | |
| 2004/0068728 A1 | 4/2004 | Blevins | |
| 2004/0107125 A1 | 6/2004 | Guheen et al. | |
| 2004/0107405 A1 | 6/2004 | Schein | |
| 2004/0158513 A1 * | 8/2004 | Musacchio | 705/32 |
| 2004/0205519 A1 | 10/2004 | Chapel et al. | |
| 2004/0210490 A1 | 10/2004 | Almstead et al. | |
| 2004/0210510 A1 | 10/2004 | Cullen, III et al. | |
| 2004/0215467 A1 | 10/2004 | Coffman et al. | |
| 2004/0260601 A1 | 12/2004 | Brief | |
| 2004/0267606 A1 | 12/2004 | Brishke et al. | |
| 2005/0114829 A1 | 5/2005 | Robin et al. | |
| 2005/0262008 A1 | 11/2005 | Cullen, III et al. | |
| 2005/0288993 A1 | 12/2005 | Weng et al. | |
| 2006/0173775 A1 | 8/2006 | Cullen et al. | |
| 2007/0124196 A1 | 5/2007 | Brief et al. | |

OTHER PUBLICATIONS

Definition of "prose" from Dictionary.com, retrieved from [http://dictionary.reference.com/browse/prose] on Aug. 7, 2008.* marketing.ebreviate.com; "Overview"; Company Information of eBreviate; Feb. 11, 2002; pp. 1-16.

www.chimes.net; "Chimes Streamlines & Digitizes RFP Administration and Project Management with Launch of Chimes PM"; Press Release from Chimes, Inc.; Feb. 25, 2002; pp. 1-4.

www.chimes.net; "Chimes, Inc. Extends Human Capital Management Solution Beyond Contingent Workforce with Launch of Centralized Applicant Management -CAM- Program"; News Room from Chimes, Inc.; Jun. 28, 2001; pp. 1-2.

www.emptoris.com; "Overview"; Company Overview of Emptoris; Apr. 15, 2002; pp. 1-18.

U.S. Appl. No. 11/351,835, Cullen et al.

U.S. Appl. No. 11/354,367, Cullen et al.

Screenshots of Volt Information Sciences, www.volt.com, Feb. 21, 1999, pp. 1-24, retrieved from: Google.com and archive.org.

Torres, Giselle; "High-Voltage Staffing Service Arrives in Puerto Rico"; Caribbean Business; Oct. 23, 1997, p. 1 (retrieved from: Dialog, file 16).

"Volt Information Sciences—Facilities & Equipment", Annual Report, 1989, p. 1 (retrieved from : Dialog, file 160.

"Volt Information Sciences to Purchase Portions of Two Lucent Technologies Subsidiaries", PR Newswire, Nov. 17, 1999, pp. 1-3, (retrieved from: Dialog, file 16.

U.S. Appl. No. 11/885,090, Cullen et al.

Leipold et al., "The World Bank e-Procurement for the Selection of Consultants: Challenges and Lessons Learned" Journal of Public Procurement, vol. 4, Issue 3, pp. 319-339.

Dysart, J., "The Data Exchange,"DG Review, vol. 11, No. 9, p. 37, Mar. 11, 1991.

Anon., "Primavera Systems; Primavera, PurchasePro.Com Create E-Commerce Marketplace for Construction Industry," M2 Presswire, Sep. 22, 1999.

Rawdon, S., "Online Bidding Options May Be Web's Best Secret," Business First-Columbus, vol. 18, No. 33, p. B11, Apr. 5, 2002.

Herman, Susan J., Hiring Right: A Practical Guide. SAGE. 1994. pp. 23-25.

U.S. Appl. No. 12/492,438, Cullen.

Cullen, A., Suppliers of Technical Nonpayroll Workers, (2 pages), Dec. 31, 1997.

Cullen, A., Skills Questionnaire, (5 pages), May 21, 1998.

Cullen, A., Skills Environment, (1 page), Jul. 2, 1998.

Cullen, A., Jobs Listing, (31 pages), Feb. 24, 1999.

Brief, V., Overview of Volt's HRP Application, (3 pages), Feb. 1999.

U.S. Appl. No. 12/342,116, Cullen.

Cullen, Andrew A. III, "Declaration of Andrew A. Cullen III", 41 pages, Jun. 18, 2008.

Consol (www, procurestaff.com via http://web.archive.org, copyright 2003) pp. 1-31.

U.S. Appl. No. 12/692,937, Cullen.

* cited by examiner

Profile Name: SQL DBA
Business Sector: Technical
Business Arena: Management Information Systems
Business Family: Database Development
General Functions: Database Administration, Database Applications Development/Analysis, Database Architecture

Skills

| Skill Category | Skill Set | Priority |
|---|---|---|
| Database: | Informix | Important |
| | Oracle | Desired |
| | SQL Server | Critical |
| Internet Platforms: | Java Servers | Critical |
| | SQL Server | Critical |
| Operating System(s): | Unix:System V | Desired |
| | Windows 95 | Critical |
| | Windows NT | Critical |
| Program Languages: | PL-SQL | Desired |
| | SQL | Critical |
| | VBScript | Critical |
| | Visual Basic | Critical |
| | XML | Desired |
| Rquired Industry Experience: | 5 Years | Required |
| Industry Background: | Health Care | Important |
| Communication Skills: | Very Good | Critical |
| Education Level: | Under Graduate Degree | Required |
| Travel Capability: | Local (50 miles) | Required |
| Team Responsibility: | Supervises Others | Critical |
| Environment: | Corporate Professional | Critical |
| Primary Language: | English | Critical |
| Secondary Language: | Dutch | Desired |

[ Save Profile ]   [ Edit Profile ]   [ Cancel Profile ]

[ Create New Pricing Record ]

*FIG. 5G*

Contractors vs Profiles Association

Profile Type

Full Time Employee (FTE)
News Paper Ad
Internet Job Board

Profiles cm_support
Drew's DBA
Drew's Oracle/Sun OS DBA
Driver
dt_collection
dt_confirm
fu_school
general
General Clerical Profile
jk_drama

Profile Details

Business Sector: Technical

Business Arena: Management Information Systems

Business Family: Database Development

General Functions: Database Administration,
Database Applications Development/Analysis,
Database Architecture

Skill Sets:
Required:

Required:
    Informix
    Oracle
    SQL Server

Education Level: Under Graduate Degree

Internet Platforms:
    Java Servers
    SQL Server

Operating System(s):
    Unix System V

To associate a "new profile" with a profile type
a) select a profile type under Profile Types
b) select-new-profile-under Profiles
c) click on associate button
To associate an existing profile with

System Tools
- Home Page
- Instructional Guide
- Deployment Module
- Client Module
- Warehouse Administration
- Price & ProfilingModule

| Select Country | Select Region | Select City/Population Center |
|---|---|---|
| United States | New York | Manhattan |

| Select Resource Type (Optional) | | Select Industry (Optional) |
|---|---|---|
| Full Time Employee | | Telecommunications |

| Specify Record Date Span | | Specify Minimal Match Percent |
|---|---|---|
| 1/1/01 – 1/01/02 | | 75% |

Submit Query

System Tools

- Home Page
- Instructional Guide
- Deployment Module
- Client Module
- Warehouse Administration
- Price & ProfilingModule

Records Matching Criteria
3/4

Warehouse Statistics

| | |
|---|---|
| Population Rate Range | $18.65–$34.50 |
| Median Hourly Rate | $25.45 |
| Standard Deviation | $5.32 |
| Average Straight Time Pay Rate | $28.60 |
| Percent Receiving Over Time Pay | 83% |
| Average Over Time Pay Rate | $42.90 |
| Average Labor Compensation | $61,352.70 |
| Percent Receiving Life Insurance | 84% |
| Health Insurance Subsidy Value | $4,630.00 |
| Percent Receiving Life insurance | 14% |
| Life Insurance Subsidy Value | $485.00 |
| Percent Receiving Tuition Subsidy | 11% |
| Tuition Subsidy Value | $3,500.00 |
| Percent Receiving 401k Contribution | 57% |
| 401k Contribution Value | $918.56 |
| Percent Receiving Vacation Pay | 8% |
| Average Vacation Pay Time | 1.43 Weeks |
| Percent Receiving Holiday Pay | 82% |
| Average Vacation Pay Time | 6 Days |
| Percent Receiving Performance Bonus | 38% |
| Performance Bonus Value | $1,217.00 |
| Percent Receiving Stock Plan Stock Value | 16% |
| Stock Value | $1,148.00 |
| No Other Benefits Data | |
| Average Benefits Amount where a majority of data population is receiving benefits | $5,548.56 |
| Population Rate Range | $41,731.20 |
| Population Rate Range | $82,312.78 |

View Matched Skills    Edit Industry Data    Edit Query Filters

*FIG. 15C*

Profile Name: SQL DBA

Business Sector: Technical
Business Arena: Enterprise Resource Applications
Business Family: SAP
General Functions(s): Functional Lead, Project Management
Job Title: SAP Functional Lead Developer

520

Bold items indicate skills match in data warehouse

Skill Sets

Education Level Under Graduate Degree
Enterprise Software Module Materials Management
Sales & Distribution

Enterprise Software Sub-Module Materials Management-Inventory Management
Materials Management-Material Valuation
Materials Management-Purchasing
Sales/Distribution-Delivery
Sales/Distribution-Order Processing Functional Development Specialties As is to be Modeling
Configuration
GAP Analysis
Project Management
WorkFlow Functional Education Discipline Materials Management

Industry Background Automotive
Manufacturing
Transportation

Project Management Specialties Client Project Liaison
Project Deliverable Controller
Project Financial Development/Planning
Project Plan Execution/Task Management
Project Resource Deployment/Management

Required Industry Experience Greater than 10 years

*FIG. 15D*

SYSTEM AND METHOD FOR COLLECTING AND PROVIDING RESOURCE RATE INFORMATION USING RESOURCE PROFILING

BACKGROUND OF THE INVENTION

1. Technical Field of the Invention

The present invention relates generally to a computer system and method for collecting human resource compensation and cost rate information, and specifically to a computer system and method for associating collected resource rate information with non-prose skills resource profiles to provide statistical data on resource rates and costs.

2. Description of Related Art

One of the most precious commodities and significant budget items for any business entity is the labor resources employed by the business entity. The labor market is a competitive and evolving market, which requires both businesses and workers to remain informed as to the current business trends and worker needs. In order to retain full-time staff or to engage qualified temporary workers, while remaining competitive and cost effective in the market place, businesses must provide a compensation package to workers that is neither above nor below the current market rate.

In the past, it has been difficult to ascertain the current market rate for specific workers due to the selective collection of rate information and the unsophisticated categorization of workers. For example, one common method of obtaining market rate information is a survey. However, most surveys group workers into broad categories and focus on specific segments of the market, which often results in inaccurate and misleading market rate information for a specific worker with a specific set of skills and a specific amount of experience.

As another example, market rate information can be collected using classified advertisements and categorizing the advertised positions using key words within the classified advertisements. However, many companies use different words for the same type of position, and therefore, the use of key words alone does not cover all of the possibilities throughout the industry. In addition, classified advertisement may not provide a large enough pool of market information, since many positions are filled in-house, through recruiters or through staff supplementation providers. Furthermore, the advertised salary or wage rate may not be the final negotiated salary or wage rate, and therefore, using classified advertisements as the only source of market rate information may skew the statistical data below the actual market rate.

Therefore, what is needed is a computer system that collects resource rate information from a variety of sources, including actual market rate sources, and associates the resource rate information with specific resource profiles to provide accurate resource rate information for specific skill sets and business experiences. In addition, what is needed is a computer system that calculates and provides configurable statistical resource rate information for specific skills sets and experiences to a requester.

SUMMARY OF THE INVENTION

To overcome the deficiencies of the prior art, embodiments of the present invention provide a computer system and method for collecting resource rate information associated with a plurality of resource profiles, each resource profile being a three-tiered hierarchical profile defined from hierarchical profile selections to identify a job category and each hierarchical profile having one or more skills associated therewith. In one embodiment, the hierarchical profile selections include at least a business sector selection, a business arena selection based on the business sector selection and a business family selection based on the business arena selection. A database maintains the resource profiles and associated resource rate information. A web-based interface to the computer system provides web pages to users to solicit the resource profile and resource rate information. Subsequent web pages are selected based upon user responses entered in previous web pages.

According to further embodiments of the present invention, the resource rate information is collected by business entities interfacing with the database to upload actual resource rate information (e.g., actual salaries, wage rates and other compensation information) for one or more resource profiles associated with the business entity into the database. The resource profiles define the job category and skills associated with one or more workers (full-time, part-time or temporary) the business entities employ. The database stores all of the business entity resource profiles and associated resource rate information. In further embodiments, the resource rate information can be supplemented from other sources, such as jobs available at the business entities, periodicals, Internet job board sites and job fair publications.

In still further embodiments of the present invention, the computer system calculates and provides statistical resource rate data (e.g., average wage rate and standard deviation) for specific resource profiles. The computer system calculates the statistical data using all resource profiles stored in the database that match resource criteria entered by a requestor. The determination of whether a particular stored resource profile matches entered resource criteria is made using matching criteria. For example, the computer system can use only those stored resource profiles that exactly match the specific resource criteria entered by the requestor or can use stored resource profiles that match up to a certain hierarchical profile selection or skills set associated with the resource criteria. The requestor can modify the specific resource criteria based upon a number of parameters (e.g., hierarchical profile selection, skills set, geographical area, industry, etc.) to narrow or broaden the amount of resource rate information included within the statistical data.

BRIEF DESCRIPTION OF THE DRAWINGS

The disclosed invention will be described with reference to the accompanying drawings, which show sample embodiments of the invention and which are incorporated in the specification hereof by reference, wherein:

FIGS. 5A-5H are exemplary screen shots illustrating sample web pages that are displayed during the resource profile creation process;

FIGS. 15A-15D are exemplary screen shots illustrating sample web pages that can be displayed during the statistical data query and display process;

FIG. 19 is a flowchart illustrating exemplary steps for updating resource records, in

DETAILED DESCRIPTION OF EXEMPLARY EMBODIMENTS

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

A labor resource (hereinafter referred to generally as a resource) is a worker employed or otherwise retained by a business entity to perform services for wages. The resource can be employed on a full-time basis, part-time basis, temporary basis or as part of a project. Each resource possesses skills, some or all of which are applicable to the job for which the wages are paid. Therefore, there is a direct relationship between the skills required for a job and the wages paid for the job. Quantifying the specific skills related to the job and associating those skills with the wages paid for the job is accomplished using embodiments of the present invention. Further embodiments of the present invention enable the calculation and provisioning of statistical wage-related data.

Figure 1:
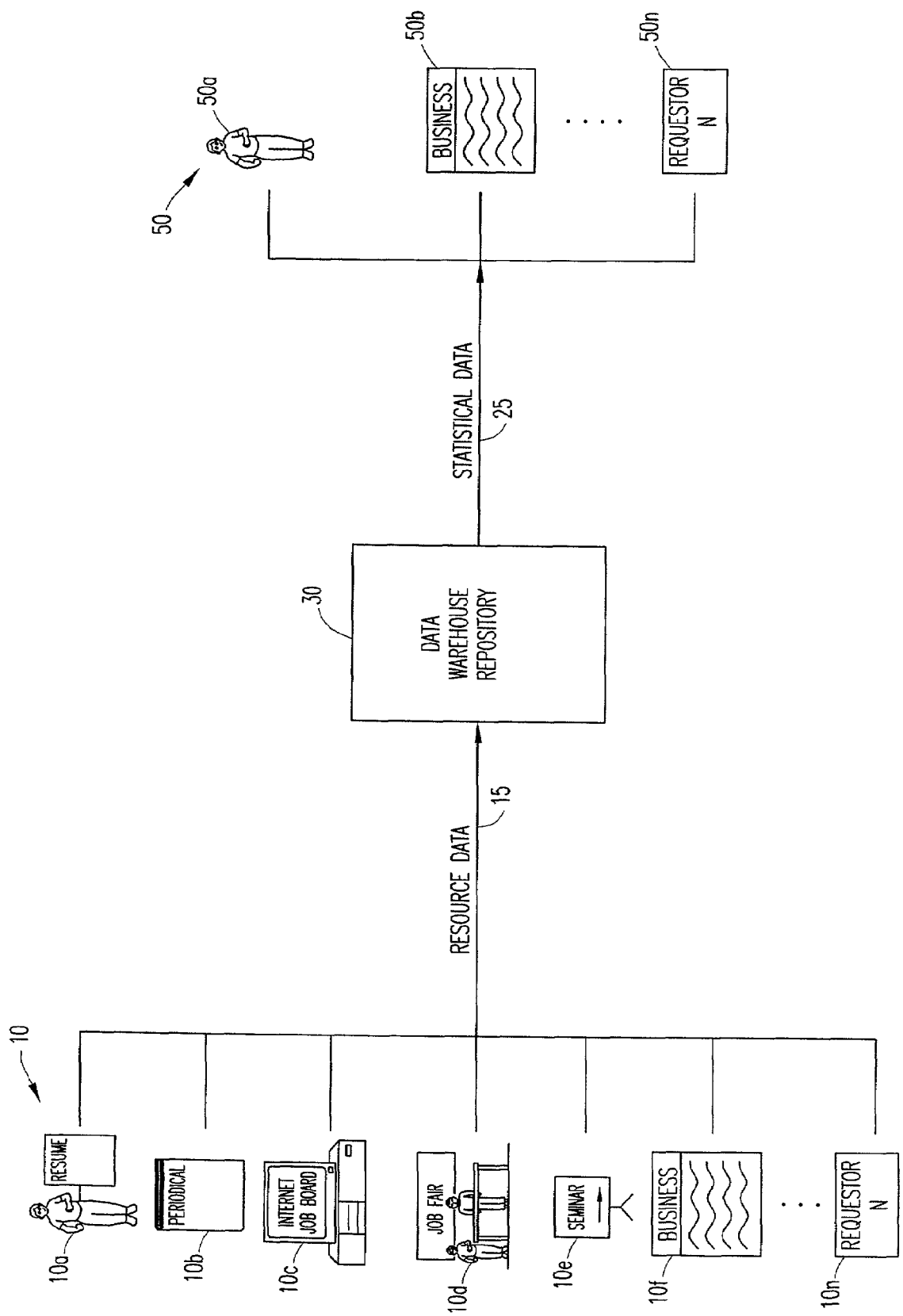
FIG. 1 is a high-level functional view of the resource profiling and statistical resource rate provisioning process involved in the present invention.

FIG. 1 is a high-level functional view of the resource profiling and resource rate provisioning process involved in the present invention. Resource data 15, including specific job-related skills and wage information associated with a particular resource, is collected by a data warehouse repository 30 from a variety of sources 10a . . . 10n. For example, the resource data 15 can be collected from individual resumes 10a, periodicals 10b (e.g., newspapers, magazines, etc.), Internet job boards 10c at job fairs 10d, seminars 10e, business entities 10f and any other source 10n of resource data 15.

The resource data 15 collected by the data warehouse company 30 is organized in a hierarchical and relational manner to facilitate accurate resource profiling based upon resource skills, resource industry and resource experience. In addition, the resource data 15 associates the resource profile with specific wage (rate) information for that resource profile based upon industry, geographical area and source 10 type. The rate information can be further categorized and relationally organized to provide inclusive compensation information pertaining to wage rates, benefits provided and expenses paid.

All of the resource data 15 collected at the data warehouse repository 30 can be aggregated and output to a data requestor 50 in the form of statistical data 25. The requestor 50 can be an individual 50a, business entity 50b or any other requestor 50n that is authorized to receive the statistical data 25. The statistical data 25 includes an analysis of a compilation of wage information associated with a particular resource profile defined by the requester 50. The statistical data 25 provided to the requester 50 can include any type of wage-related data, such as the average pay rate across a geographic area, the pay rate range, the average dollar amount of benefits provided, the average expenses paid, the standard deviation of the above and any other statistical data requested by the requester.

Figure 2:
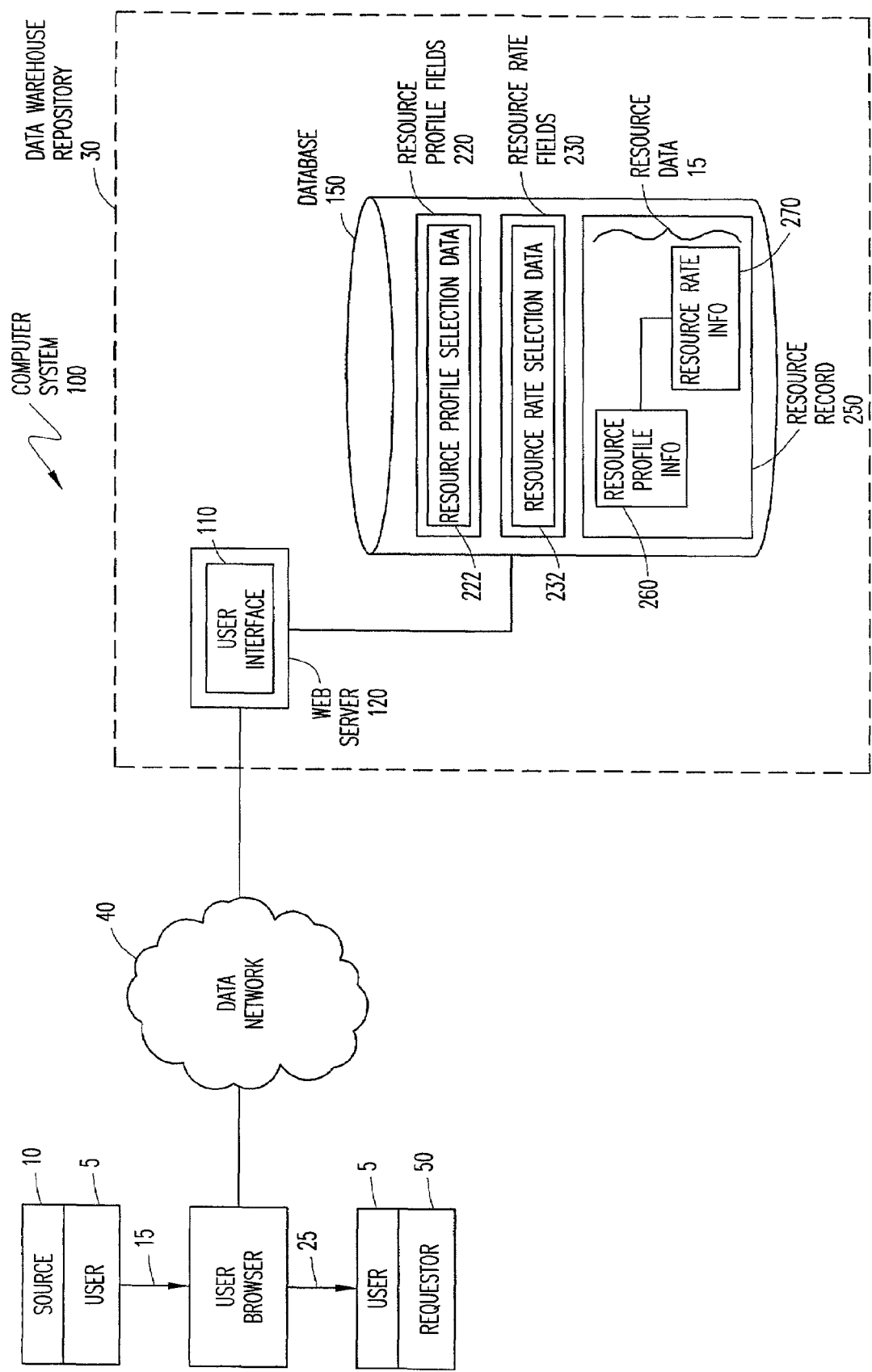
FIG. 2 is an exemplary network diagram of a computer system implementing the resource profiling and statistical resource rate provisioning process of the present invention.

In accordance with embodiments of the present invention, the data warehouse repository 30 can be implemented within a computer system 100, as is shown FIG. 2. A user 5 can enter the computer system 100 through a data network 40 via a web browser 20. A user 5 includes any person associated with a source 10 of resource data 15 or any person associated with a requestor 50 of statistical data 25. By way of example, but not limitation, the data network 40 can be the Internet or an Intranet and the web browser 20 can be any available web browser or any type of Internet Service Provider (ISP) connection that provides access to the data network 40. The user 5 accesses the computer system 100 through a web server 120 capable of pushing web pages to the web browser 20. The web server 120 can be, for example, a Microsoft Internet Information Services (IIS) server.

The web server 120 enables users to interface to a database 150 maintaining the resource data 15 within resource records 250. The database 150 can be, for example, a SQL server. The resource data 15 stored in the resource records 250 includes both resource profile information 260 and resource rate information 270. The resource profile information 260 includes at least a non-prose hierarchical profile defined from hierarchical profile selections to identify a job category. The resource profile information 260 can further include one or more skills associated with the hierarchical profile. The skills associated with the hierarchical profile can define general functions identifying the level of skill associated with the job category and the resource, skills categories identifying the types of skills, training and experience that the resource possesses and one or more skills sets associated with each skills category to further define the specific experience associated with the resource. The resource rate information 270 associated with a particular resource profile information 260 can further be categorized to identify specific compensation information pertaining to wage rates, benefits provided and expenses paid for that resource profile information 260 based upon industry, geographical area and source type.

The web server 120 further interfaces with the database 150 to retrieve resource profile fields 220 containing resource profile selection data 222 and provide the resource profile selection data 222 to a source user 5 to select from to create the resource profile information 260 including the hierarchical profile and associated skills. In addition, the web server 120 interfaces with the database 150 to retrieve resource rate fields 230 containing resource rate selection data 232 and provide the resource rate selection data 232 to a source user 5 to select from to create the resource rate information 270 including the compensation information. The resource profile fields 220 and resource rate fields 230 are organized in a hierarchical and relational manner mirroring one or more of the resource profile information 260 and resource rate information 270 to enable the source user to create the hierarchical resource profile information 260 and resource rate information 270 from resource profile selection data 222 and resource rate selection data 232, respectively.

The web server 120 provides the resource profile selection data 222 and resource rate selection data 232 to the source user 5 to select from and receives the resource data 15 (i.e., the profile information 260 and resource rate information 270) entered by the source user 5 into the computer system 100 through a browser-based user interface 110. In addition, the web server provides statistical data 25 to a user 5 associated with a requester 50 through the browser-based user interface 110.

Figure 3:
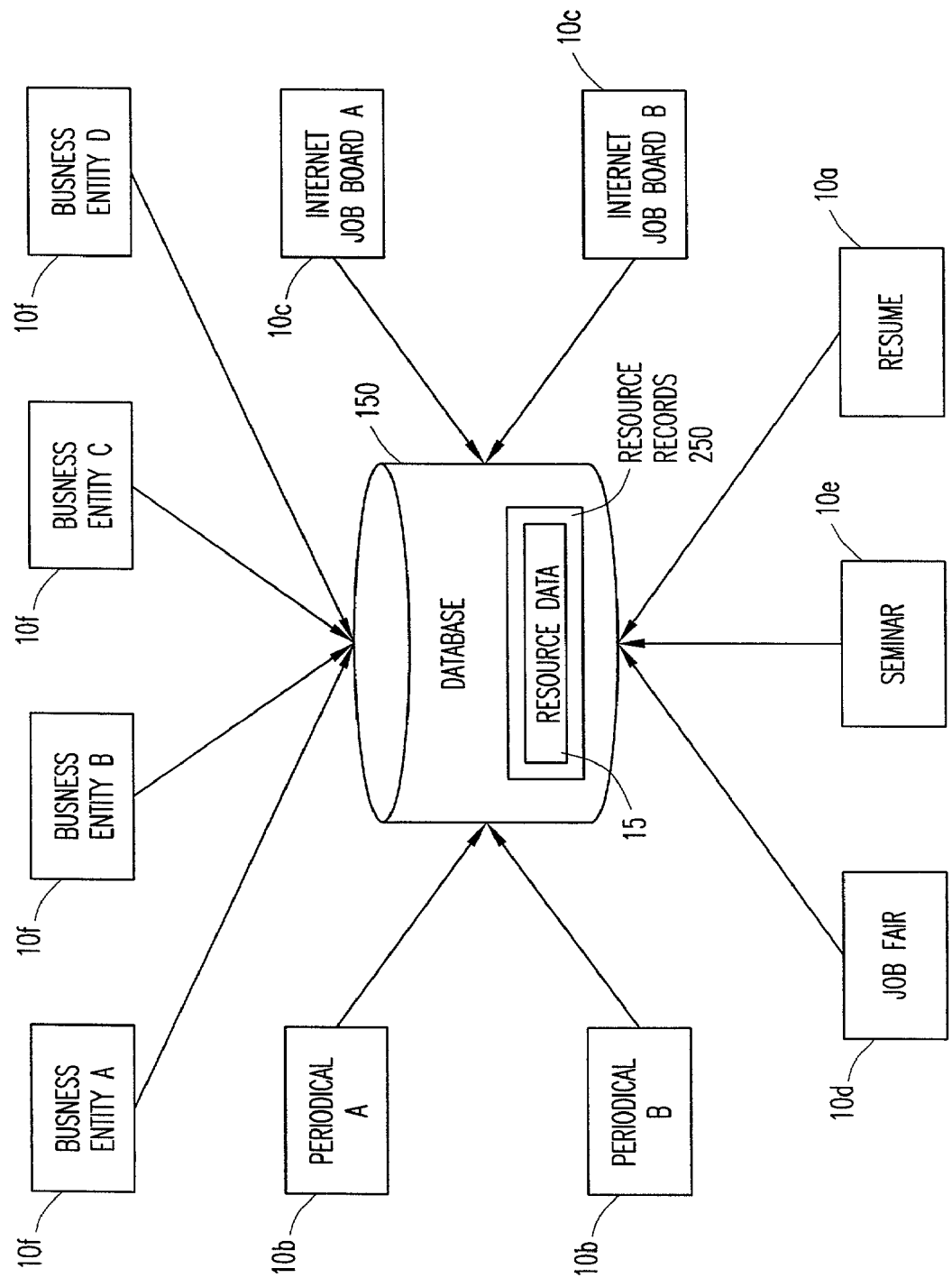
FIG. 3 is a source diagram illustrating exemplary sources of the resource profile information and resource rate information stored in the database of FIG. 2.

As shown in FIG. 3 and described above in connection with FIG. 1, the resource records 250 stored within the database 150 are generated from a variety of sources 10. The resource data 15 can be collected from individual resumes containing resource rate information 10a, various periodicals 10b having available positions listed, job fair publications or handouts 10d, seminar publications or handouts 10e, job postings on Internet job board sites 10c and various business entities 10f. The resource data 15 can be entered into the database 150 by a user (e.g., employee) associated with the computer system 100 or other authorized user. For example, a user associated with a particular business entity 10f can enter resource records 250 for one or more of the employees (full-time, part-time or temporary) of the business entity 10f and/or one or more of the positions available at the business entity 10f into the database 150. The business entity 10f can create a separate resource record 250 for each employee, separate resource records 250 for each job category and skills associated with multiple employees or separate resource records 250 for one or more select employees. Alternatively, the business entity 10f can store resource data 15 in a database (not shown) associated with the business entity 10f, and the database 150 of the computer system 100 can periodically upload the resource data 15 into resource records 250 within the database 150. In one embodiment, in exchange for providing the resource data 15, the computer system 100 operator could allow the business entity 10f access to statistical data 25 (shown in FIGS. 1 and 2) associated with the resource records 250 stored in the database 150, as will be described in more detail below in connection with FIGS. 14-16.

Figure 4:
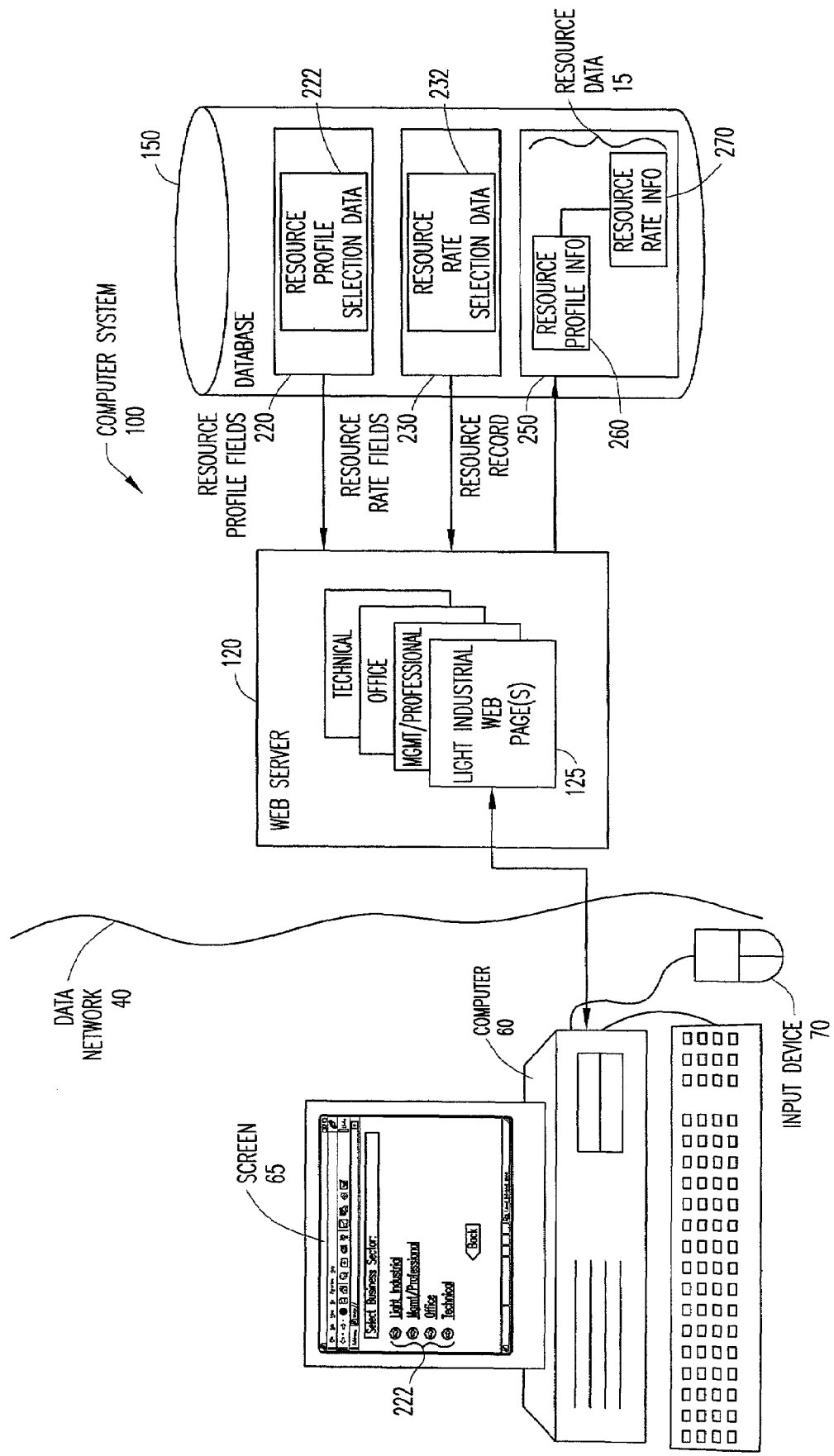
FIG. 4 is an exemplary functional view illustrating a web-based interface to the computer system for creating a resource record storing both resource profile information and resource rate information.

Referring now to FIG. 4, an exemplary functional view of a sample resource record creation process is shown. A user accesses the web server 120 of the computer system 100 by connecting a computer 60 to a data network 40. The computer 60 can be, for example, a personal computer, a laptop computer, a computer connected to a wireless device for remote access to the data network, a handheld wireless device providing a web browser capable of accessing the data network or other type of device implementing a web browser. Upon entering the Uniform Resource Locator (URL) of the web server 120, a connection between the computer 60 and the web server 120 is created. The web server 120 pushes web pages 125 to the computer 60 for viewing by the user on a user interface device 65. In one embodiment, the user interface device 65 can be, for example, a computer screen 15 connected to the computer 60. For example, once the user has been validated (e.g., by entering a user name and password), the user can view one or more web pages 125 on the computer screen 65, each containing prompts for the user to enter various information into the computer system 100. The user can enter the information into the computer 60 for transmission via the data network 40 to the web server 120 via any type of input device 70. By way of example, but no limitation, the input device 70 could be a mouse (as illustrated), keyboard, touch screen, voice recognition software or light pen. The subsequent web pages that are pushed to the computer 60 are based upon the information entered by the user in response to the prompts. In addition, the web pages 125 can be pushed to the computer 60 one-at-a-time or in bulk, depending upon the type of information being solicited by the computer system 100 and the settings of the computer system 100.

For example, as can be seen in FIG. 4, the web page 125 displayed on the computer screen 65 requests the user to "Select Business Sector" to create the resource profile information for the resource record 250. The web page 125 further prompts the user to select from the following choices 222: Light Industrial, Mgmt./Professional, Office and Technical. The user selects one of the choices, using the input device 50, and the selected resource profile information is transmitted from the computer 60 to the web server 120 via the data network 40. Based upon the selected resource profile information, the web server 120 selects and provides subsequent web pages 125 to the computer 60 to solicit additional information. As shown in FIG. 4, if the user selects the choice "Light Industrial," in response, web server 120 pushes one or more "Light Industrial Web Pages" 125 to the computer 60.

Each web page 125 pushed to the computer 60 is populated with data retrieved from resource profile fields 220 or resource rate fields 230 stored within the database 150. The resource profile fields 220 include resource profile selection data 222, such as the resource profile selections or prompts to be displayed on the web pages 125 to the user via the user-interface device 65, and the resource rate fields 230 include resource rate selection data 232, such as the resource rate selections or prompts to be displayed on the web pages 125. For example, when the web server 120 receives resource profile information entered by the user, the web server 120 accesses the resource profile fields 220 to retrieve the data to be populated in subsequent web pages (e.g., "Light Industrial" web pages 125).

The resource profile fields 220 and resource rate fields 230 are organized in a hierarchical manner to enable the web server 120 to determine the appropriate fields 220 and 230 to use for populating subsequent web pages 125. For example, the web server 120 can include a pointer (not shown) that points to a particular resource profile field 220 in the database 150. When the web server 120 receives new resource profile information from the user, the web server 120 uses the pointer to locate the current resource profile field 220 associated with the previous resource profile information and moves the pointer to the next resource profile field 220 associated with the new resource profile information. The resource profile fields 220 and resource rate fields 230 are further organized in a relational manner, so that when a user has completed the resource profile information, the web server 120 accesses the resource rate fields 230 to populate subsequent web pages 125 with resource rate selection data 232.

The resource profile fields 220 and resource rate fields 230 are scalable and configurable to meet the needs of each particular industry and each particular user. Thus, new resource profile fields 220 and resource rate fields 230 and new data 222 or 232 within the resource profile fields 220 and resource rate fields 230 can be easily added to the database 150 at any time. In addition, users can update their records 250 at any time with the new data 222 or 232 and/or fields 220 or 230. For example, the computer system 100 can send periodic update messages (e.g., via electronic mail messages and/or via posting on a dashboard) to the users with the new data 222 or 232 and/or fields 220 or 230 available, as is described in more detail hereinbelow in connection with FIGS. 17-19.

Examples of resource profile fields 220 and resource profile selection data 222 stored within the database 150 are illustrated in Tables 1-3 hereinbelow. The resource profile fields 220 are illustrated for simplicity as being organized in a table format, with each table including all of the fields 220 necessary for displaying resource profile selection data 222 on a particular web page 125. The tables are related in a hierarchical manner, such that the tables are accessed in a particular order.

TABLE 1

TblBusinessSector

| Bus_Sector_ID | Bus_Sector_Name | ASP_Display_Order |
|---|---|---|
| 1 | Light Industrial | 4 |
| 2 | Mgmt/Professional | 2 |
| 3 | Office | 3 |
| 4 | Technical | 1 |

TABLE 2

TblBusinessArena

| Bus_Arena_ID | Bus_Sector_ID | Bus_Arena_Name | ASP_Display_Order |
|---|---|---|---|
| 1 | 3 | Administrative Support | 5 |
| 2 | 4 | Business Support | 5 |
| 3 | 4 | Communications Software | 10 |
| 4 | 2 | Controller | 10 |
| 5 | 4 | Enterprise Resource Applications | 15 |
| 6 | 2 | Finance | 15 |
| 7 | 3 | General Business Support | 10 |
| 8 | 3 | General Clerical | 15 |
| 9 | 1 | General Support | 5 |
| 10 | 2 | Human Resources | 20 |
| 11 | 2 | Legal | 25 |
| 12 | 1 | Logistics Support | 10 |
| 13 | 4 | Management Information Systems | 20 |
| 14 | 2 | Manufacturing | 30 |
| 15 | 2 | Materials Management | 35 |
| 16 | 4 | Network Engineering | 25 |
| 17 | 4 | Product Development | 30 |
| 18 | 1 | Production | 15 |
| 21 | 2 | Sales | 40 |
| 22 | 2 | Call Center | 5 |

TABLE 3

TblBusinessFamily

| Bus_Family_ID | Bus_Arena_ID | Bus_Family_Name | ASP_Display_Order |
|---|---|---|---|
| 1 | 16 | Network Design/Planning/Consulting | 5 |
| 2 | 16 | Network Infrastructure | 10 |
| 3 | 16 | Network Operations/Administration | 15 |
| 4 | 3 | OS Programming | 15 |
| 5 | 3 | Application Development | 5 |
| 6 | 3 | Database Development | 10 |
| 8 | 17 | Product Management | 10 |
| 9 | 17 | Product Design/Development | 5 |
| 10 | 13 | OS Programming | 9 |
| 11 | 13 | Network Infrastructure Support | 15 |
| 12 | 13 | Application Development | 5 |
| 13 | 13 | Network Management/Administration | 20 |
| 14 | 5 | SAP | 20 |
| 15 | 5 | PeopleSoft | 15 |
| 16 | 5 | Oracle | 10 |
| 17 | 5 | Baan | 5 |

TABLE 3-continued

TblBusinessFamily

| Bus_Family_ID | Bus_Arena_ID | Bus_Family_Name | ASP_Display_Order |
|---|---|---|---|
| 18 | 2 | Business Analysis | 5 |
| 19 | 2 | Business Support | 10 |
| 20 | 8 | General Clerical Support | 5 |
| 21 | 1 | Administrative Support | 5 |
| 23 | 9 | Maintenance | 5 |
| 24 | 9 | Driver/Courier | 10 |
| 26 | 12 | Shipping/Receiving | 5 |
| 27 | 12 | Distribution | 10 |
| 28 | 12 | Inventory Control | 15 |
| 29 | 18 | Light Assembly | 5 |
| 30 | 18 | Electronic Assembly | 10 |
| 31 | 18 | Qualify Assurance/Control | 15 |
| 32 | 4 | Assets Management | 5 |
| 33 | 4 | Audit | 10 |
| 34 | 4 | Budgeting | 15 |
| 35 | 4 | Cost Center Accounting | 20 |
| 36 | 4 | Overheads | 25 |
| 37 | 4 | Product Costing | 30 |
| 38 | 4 | Profit Center Accounting | 35 |
| 39 | 4 | Profitability | 40 |
| 40 | 4 | Project Accounting | 45 |
| 41 | 4 | Taxation | 50 |
| 42 | 4 | TreasuryCash Management | 55 |
| 43 | 6 | Accounts Payable | 5 |
| 44 | 6 | Accounts Receivable | 10 |
| 45 | 6 | Capital Investment | 15 |
| 46 | 6 | Consolidation | 20 |
| 47 | 6 | Credit/Collections | 25 |
| 48 | 6 | General Ledger | 30 |
| 49 | 6 | Other Ledgers | 35 |
| 50 | 10 | Benefits | 5 |
| 51 | 10 | Payroll | 10 |
| 52 | 10 | Personnel | 15 |
| 53 | 10 | Services | 20 |
| 54 | 11 | Antitrust Law | 5 |
| 55 | 11 | Contract Law | 10 |
| 56 | 11 | Corporate Law | 15 |
| 57 | 11 | Environmental Law | 20 |
| 58 | 11 | International Law | 25 |
| 59 | 11 | Labor Law | 30 |
| 60 | 11 | Real Estate Law | 35 |
| 61 | 11 | Taxation Law | 40 |
| 62 | 14 | Maintenance in Manufacturing | 5 |
| 63 | 14 | Manufacturing Process | 10 |
| 64 | 14 | Manufacturing Production | 15 |
| 65 | 14 | Manufacturing Quality Control | 20 |
| 66 | 15 | Distribution/Transportation/Warehousing | 25 |
| 67 | 15 | Materials Management | 30 |
| 68 | 15 | Purchasing | 35 |
| 69 | 21 | Sales Management | 5 |
| 70 | 21 | Sales Operations | 10 |
| 71 | 22 | Customer Service | 5 |
| 72 | 22 | Operations | 10 |
| 73 | 22 | Sales/Marketing | 15 |
| 74 | 7 | Book Keeping | 5 |
| 75 | 7 | Database Support | 10 |
| 76 | 7 | Desk Top Publishing | 15 |
| 77 | 7 | Spreadsheet Support | 20 |
| 78 | 13 | Database Development | 10 |

The resource profile fields 220 shown in Tables 1-3 above contain resource profile selection data 222 for soliciting a three-tiered hierarchical resource profile from the user to identify a job category associated with a particular resource. Referring again to the example shown in FIG. 4, the "Select Business Sector" web page 125 is populated with the resource profile selection data 222 included within the "Business Sector" table shown in Table 1. The "Business Sector" table includes a "Bus_Sector_Name" field 220 listing the business sectors 222 for the user to choose from, a "Bus_Sector_ID" field 220 listing the identification numbers 222 of each of the business sectors and an "ASP_Display_Order" field 220 listing the display order 222 for each of the business sectors.

When the user selects "Light Industrial" as the business sector, the computer system 100 can further categorize the job associated with the resource by enabling the web server 120 to retrieve the "Business Arena" table shown in Table 2 above from the database 150 and populate the next web page 125 with resource profile selection data 222 containing several "Business Arenas": General Support, Logistics Support and Production. The "Business Arena" table includes a "Bus_Arena_ID" field 220 listing the identification numbers 222 of each of the business arenas, the "Bus_Sector_ID" field 220 listing the business sector identification numbers 222 associated with each of the business area identification numbers, a "Bus_Arena_Name" field 220 listing the names 222 of the business arenas to be displayed on the web page 125 and an "ASP_Display_Order" field 220 listing the display order 222 for the business arenas on the web page 125. However, it should be understood that the business arena fields 220 for each of the business sector fields 220 can be subdivided into separate tables.

Depending upon the business arena selected by the user, the computer system 100 can further define the job category associated with the resource by enabling the web server 120 to next access the "Business Family" table shown in Table 3 above within the database 130 to populate the next web page 125 with resource profile selection data 222 containing business families for the user to choose from. The "Business Family" table includes a "Bus_Family_ID" field 220 listing the identification numbers 222 of each of the business families, the "Bus_Arena_ID" field 220 listing the business arena identification numbers 222 associated with each of the business family identification numbers, a "Bus_Family_Name" field 220 listing the names 222 of the business families to be displayed on the web page 125 and an "ASP_Display_Order" field 220 listing the display order 222 for the business families on the web page 125. The web server 120 populates the next web page 125 with only those business families having the selected business arena identification number associated therewith. However, it should be understood that the business family fields 220 for each of the business arena fields 220 can be subdivided into separate tables.

Figure 5A:
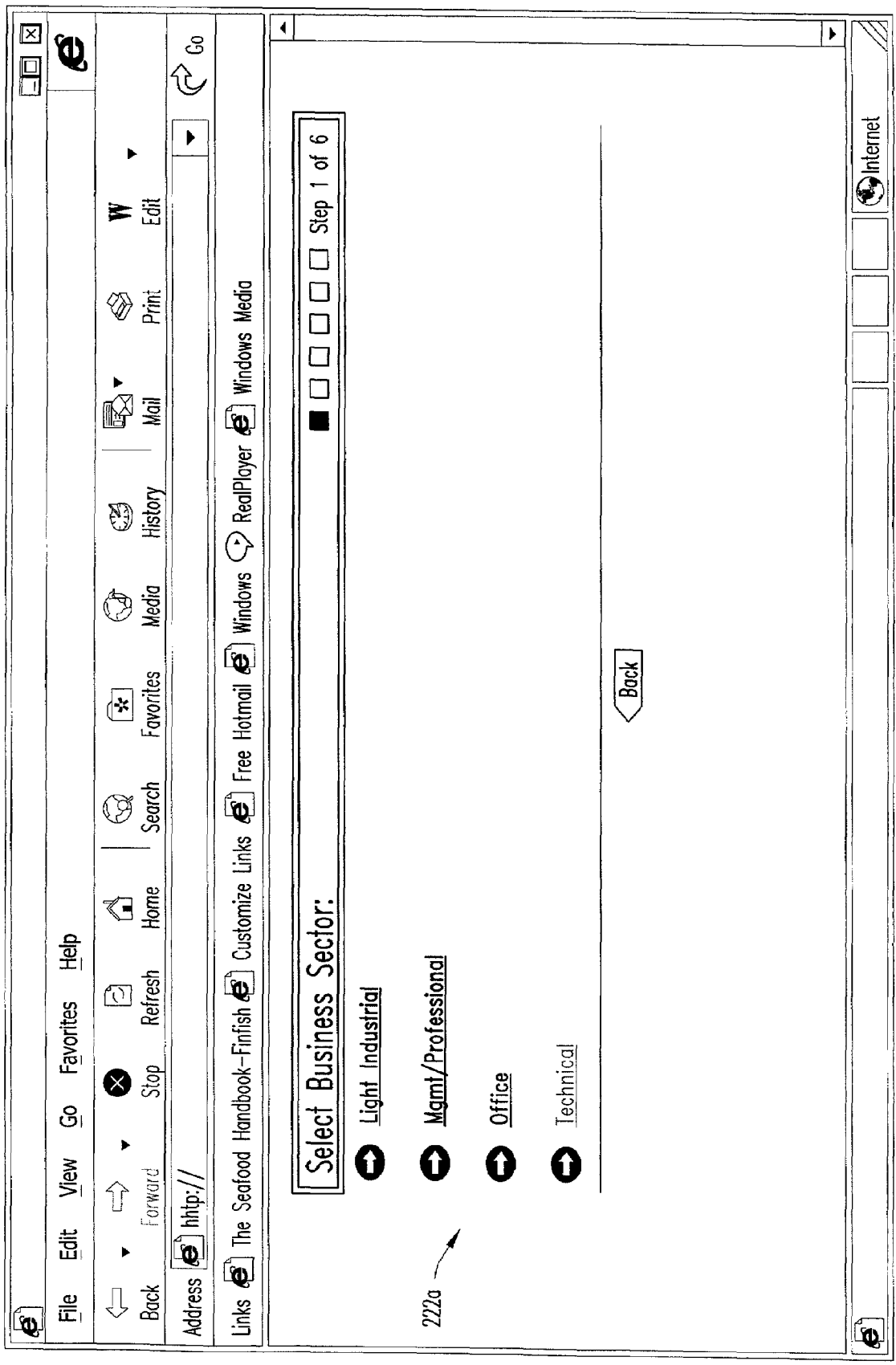
Figure 5B:
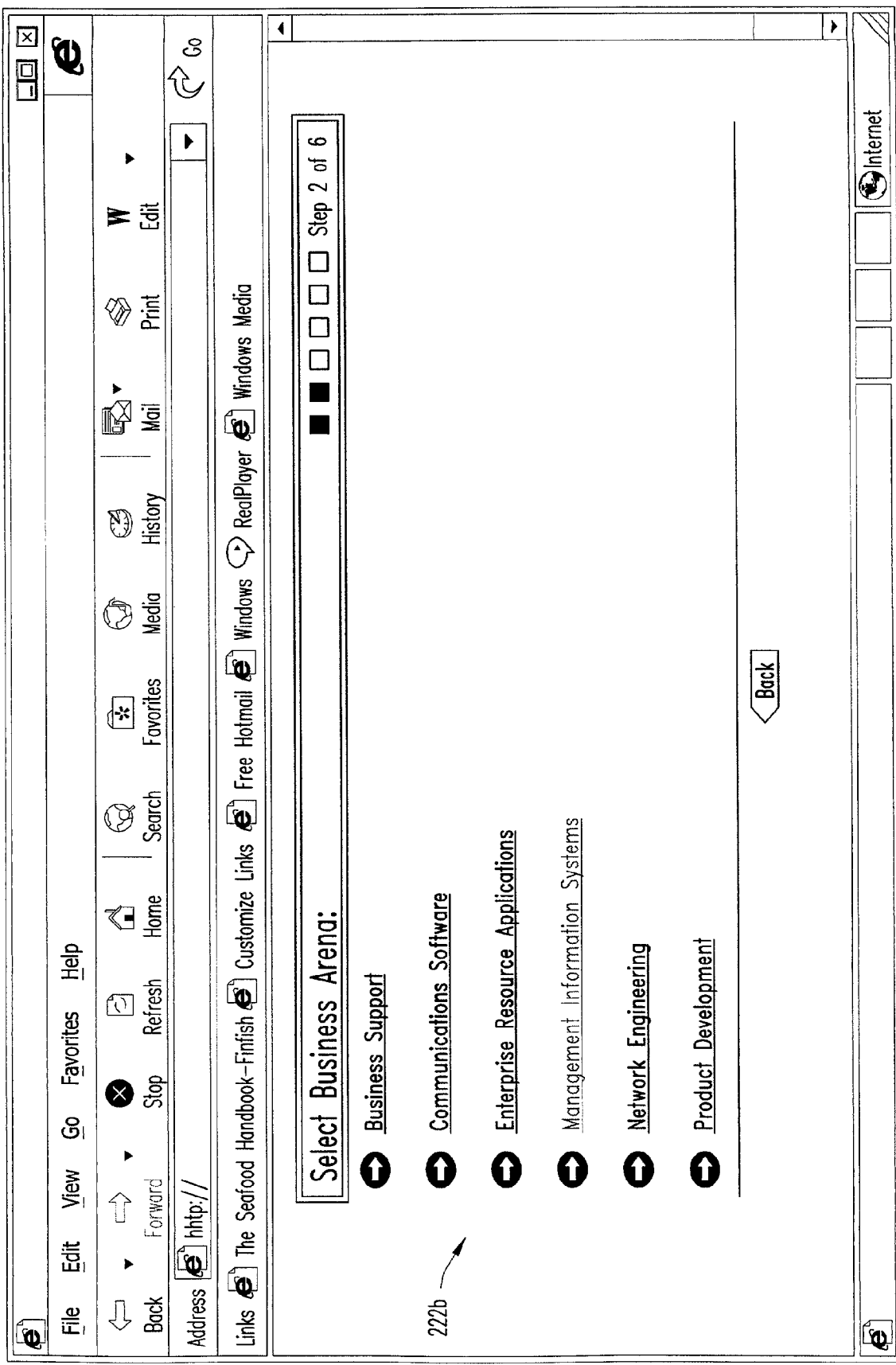
Figure 5C:
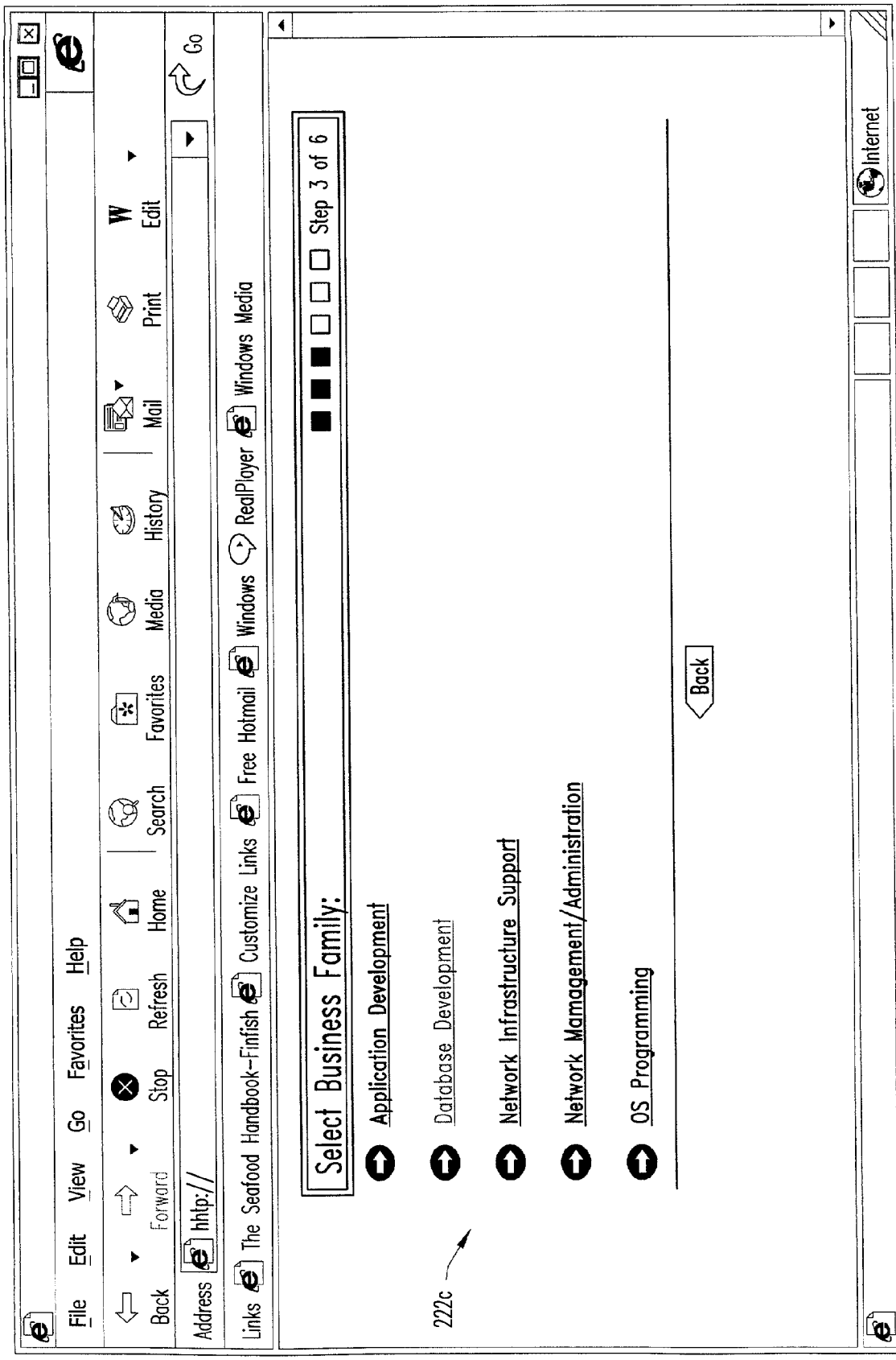
Figure 5D:
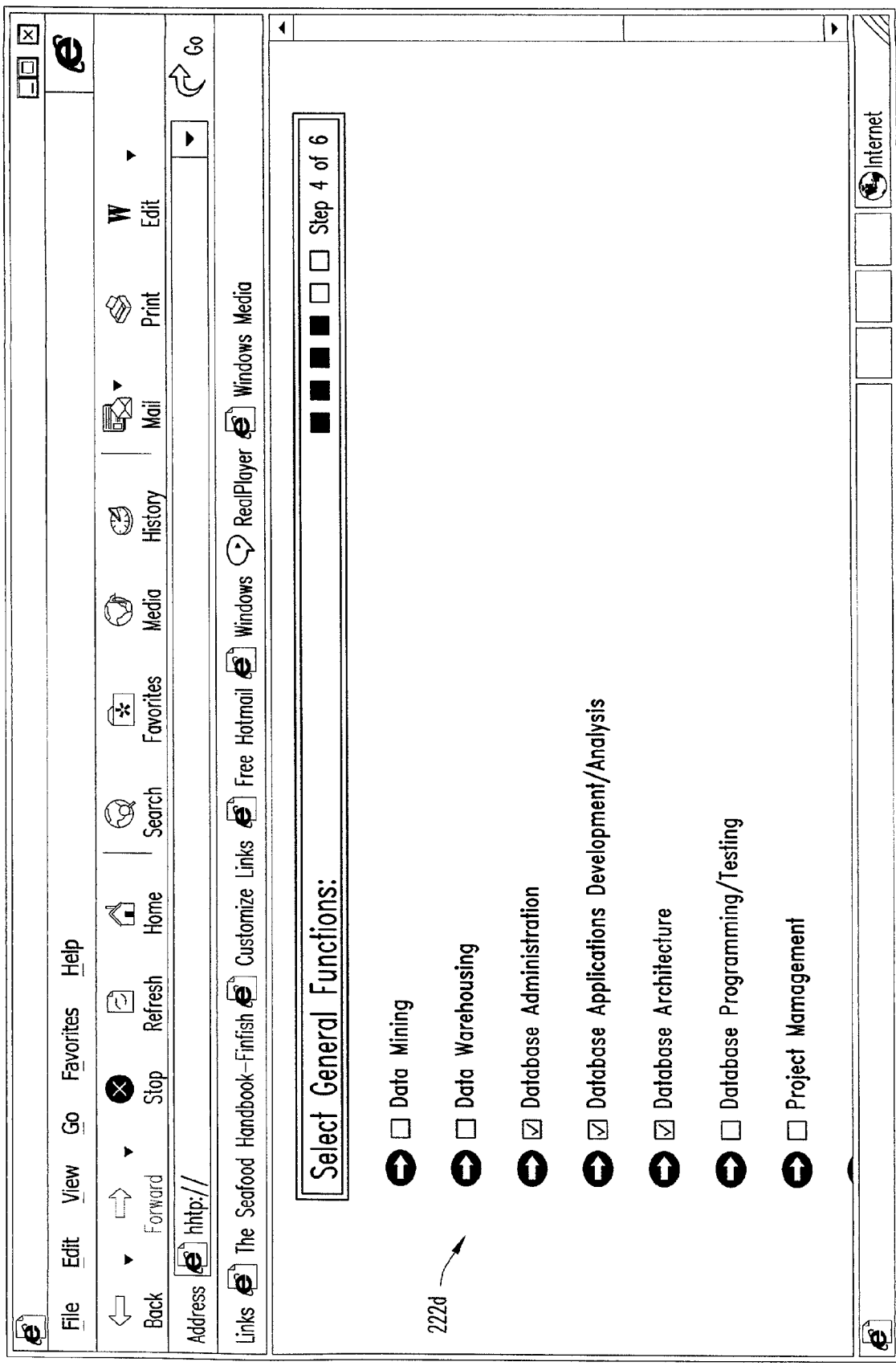

Sample web pages that can be presented to a user to solicit the resource profile information are shown in FIGS. 5A-5G. FIG. 5A lists exemplary business sector resource profiling selection data 222a for the user to select from. As can be seen in FIG. 5A, the user has selected "Technical" as the business sector selection, and therefore, the next web page in FIG. 5B lists exemplary business arena resource profiling selection data 222b associated with the "Technical" business sector. As can be seen in FIG. 5B the user has selected "Management Information Systems" as the business arena, and therefore, the next web page in FIG. 5C lists exemplary business family resource profiling selection data 222c associated with the "Management Information Systems" business arena. As shown in FIG. 5C, the user has selected "Database Development" as the business family.

Once the three-tiered hierarchical resource profile (i.e., job category) has been defined, the particular skills possessed by the resource and associated with the job category can be defined using subsequent tables/web pages, as is shown in FIGS. 5D-5G. For example, the next web page in FIG. 5D can list exemplary general function resource profiling selection data 222d, and the user can be asked to select one or more general functions associated with the resource. The general function resource profiling selection data 222d is used to solicit the level of skill associated with the resource from a functions perspective. As an example, the user has selected the following general functions in FIG. 5D: Database Administration, Database Applications Development/Analysis and Database Architecture. All of the selected functions indicate that the level of skill of the particular resource is fairly high, since the functions are all typically performed by management/administrator personnel.

Figure 5E:
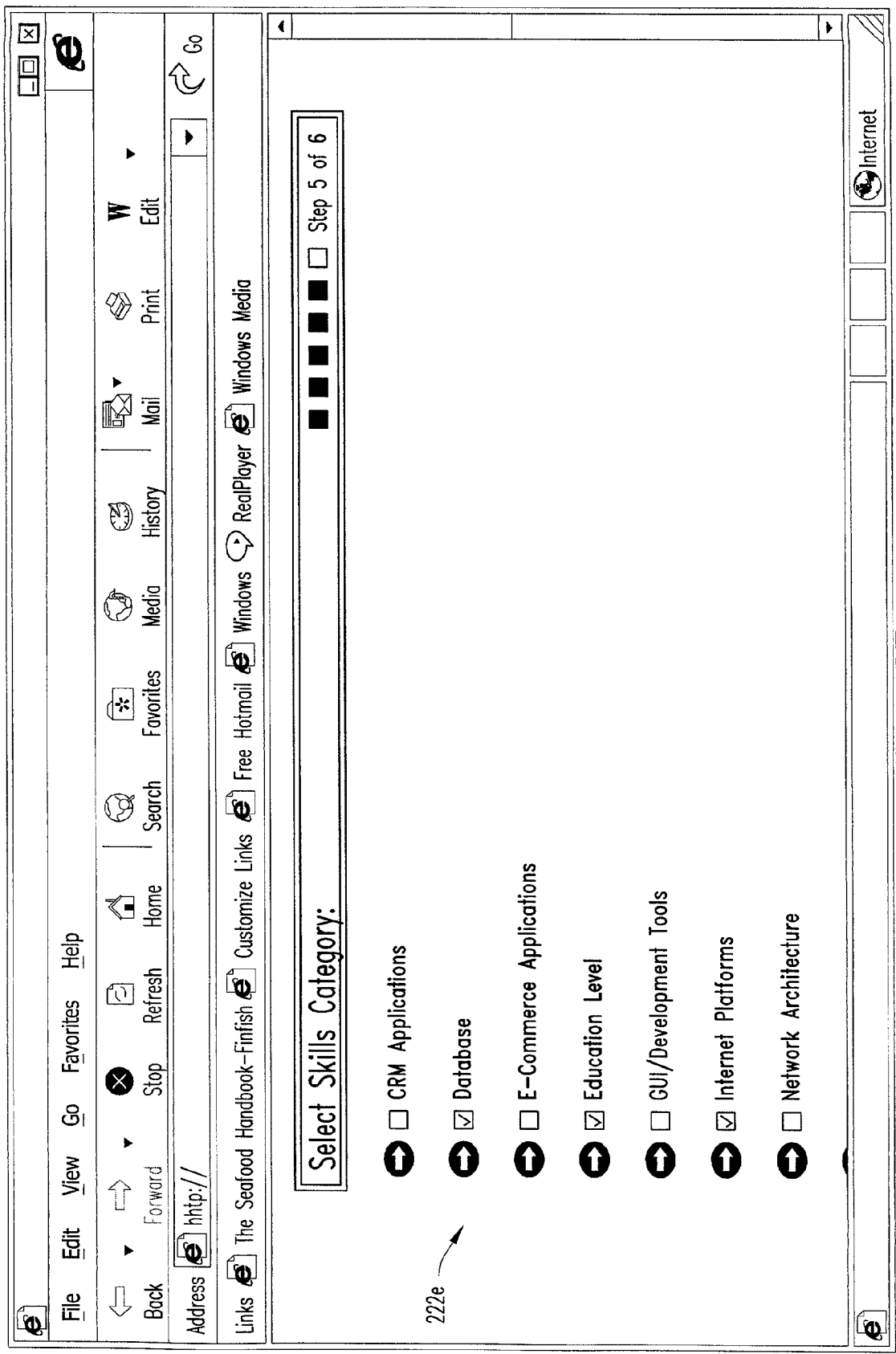

In addition to selecting the general functions to determine the level of skill of the resource, a web page can also be presented to the user listing skills category resource profile selection data 222d, as is shown in FIG. 5E. The skills category resource profile selection data 222d is used to solicit the types of skills and experiences that the resource has. The types of skills are not necessarily limited to specific job-related skills, but also to other skills the particular resource may possess, such as education level, linguistic ability, travel capability, industry backgrounds and communication skills. As is shown in FIG. 5E, the user has selected at least the following skills categories (not all skills categories are shown in FIG. 5E): Database, Education Level and Internet Platforms.

Figure 5F:
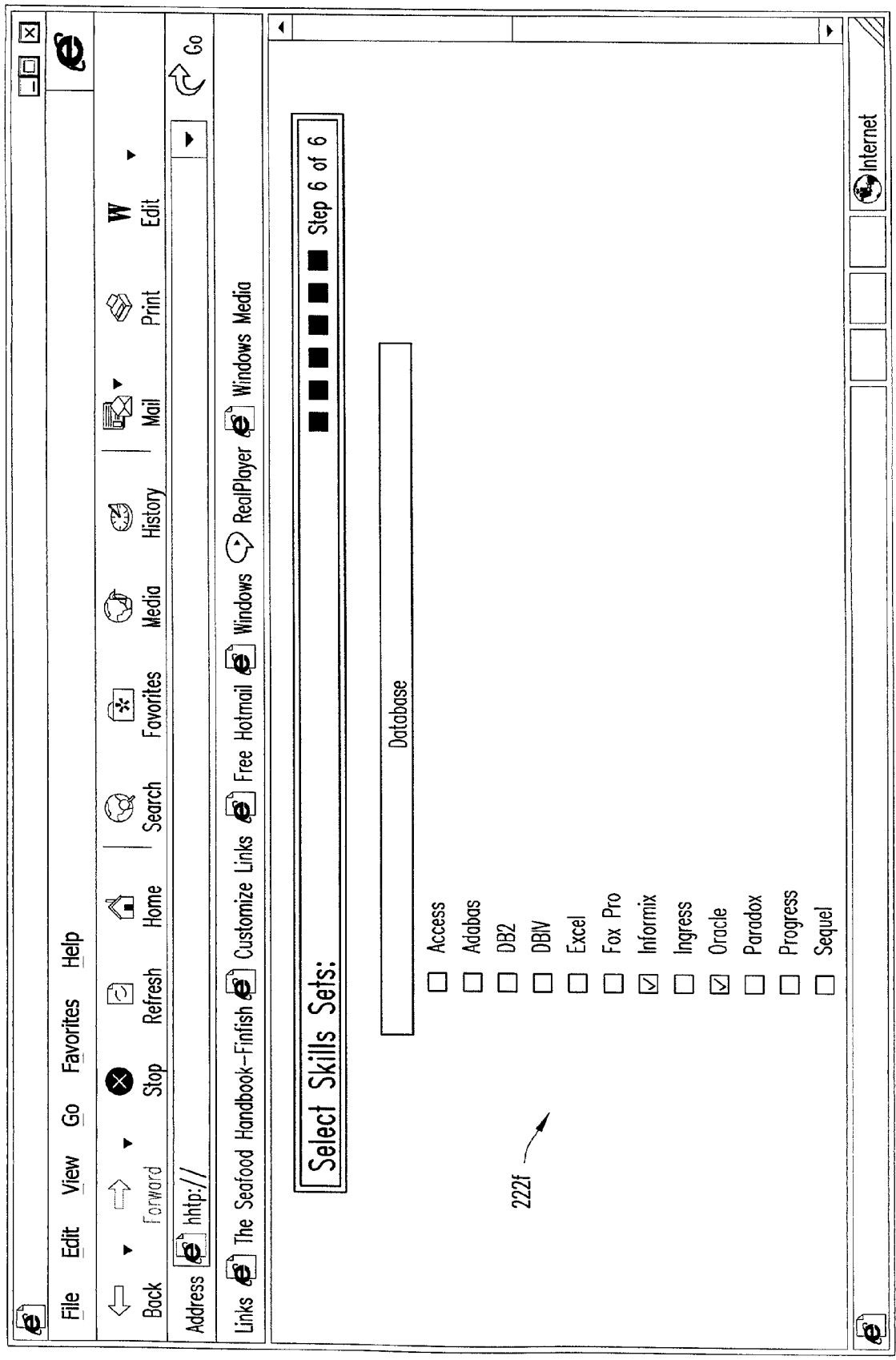

For each of the skills categories that the user selects, a separate web page listing skills sets resource profiling selection data 222f is presented to the user, an example of which is shown in FIG. 5F. The skills sets resource profiling selection data 222f is used to solicit the specific skills sets (experience) for a particular skills category that the user selected. For example, FIG. 5F is a web page showing skills sets resource profiling selection data 222f for the Database skills category that the user selected in FIG. 5E. As can be seen in FIG. 5F, the user has selected the following skills sets associated with the particular resource and pertaining to the Database skills category: Informix and Oracle. It should be understood that a separate web page is presented to the user for each skills category that the user selects in order to solicit the specific skills sets that the resource possesses with respect to the skills category.

An example of a web page containing all of the entered resource profile information is shown in FIG. 5G. The "Business Sector," "Business Arena" and "Business Family" selections entered by the user in FIGS. 5A-5C are shown, along with the "General Functions" entered by the user in FIG. 5D. In addition, the skills sets entered by the user in conjunction with FIGS. 5E-5F are shown. For example, under "Skill Set," there is a listing of the particular "Skills Categories" that the user selected (of the type shown in FIG. 5E), the particular "Skills" within each of the "Skills Categories" that the user selected (of the type shown in FIG. 5F) and the "Priority" assigned to each of the "Skills" within the "Skills Categories." From the web page shown in FIG. 5G, the user can further be provided the option to save the resource profile information as a resource record ("Save Profile"), edit the resource profile information ("Edit Profile"), delete the resource profile information ("Cancel Profile") or create resource rate information associated with the resource profile information ("Create New Pricing Record").

In another embodiment, as shown in FIG. 5H, instead of entering the resource profile information separately each time, the user can instead choose from one or more pre-configured resource profiles, and associate a particular resource profile type with one of the pre-configured resource profiles to create a new resource record. For example, if the user is a business entity user that wants to enter multiple full-time employees into the database, the business entity user can associate each full-time employee with a pre-configured resource profile to create a resource record in the database for that full-time employee. In addition, if there are multiple employees that have the same resource profile, the business entity could associate multiple employees with the same pre-configured resource profile and the resource record can include an indication of the number of employees associated with that resource record.

The pre-configured resource profiles can be established in advance by the business entity or computer system operator. In addition, the pre-configured resource profiles can include any level of detail related to general function, skills categories and skills, depending upon the needs of the user. As another example, if the user is a computer system user that wants to enter one or more job advertisements from a newspaper, the computer system user can associate each job advertisement with a particular pre-configured resource profile to create a resource record in the database for that job advertisement. Once the resource record including the pre-configured resource profile has been created, the user can be presented a web page similar to FIG. 5G to prompt the user to either save the resource profile information, delete the resource profile information, edit the resource profile information or create resource rate information associated with that resource profile information.

Figure 6A:
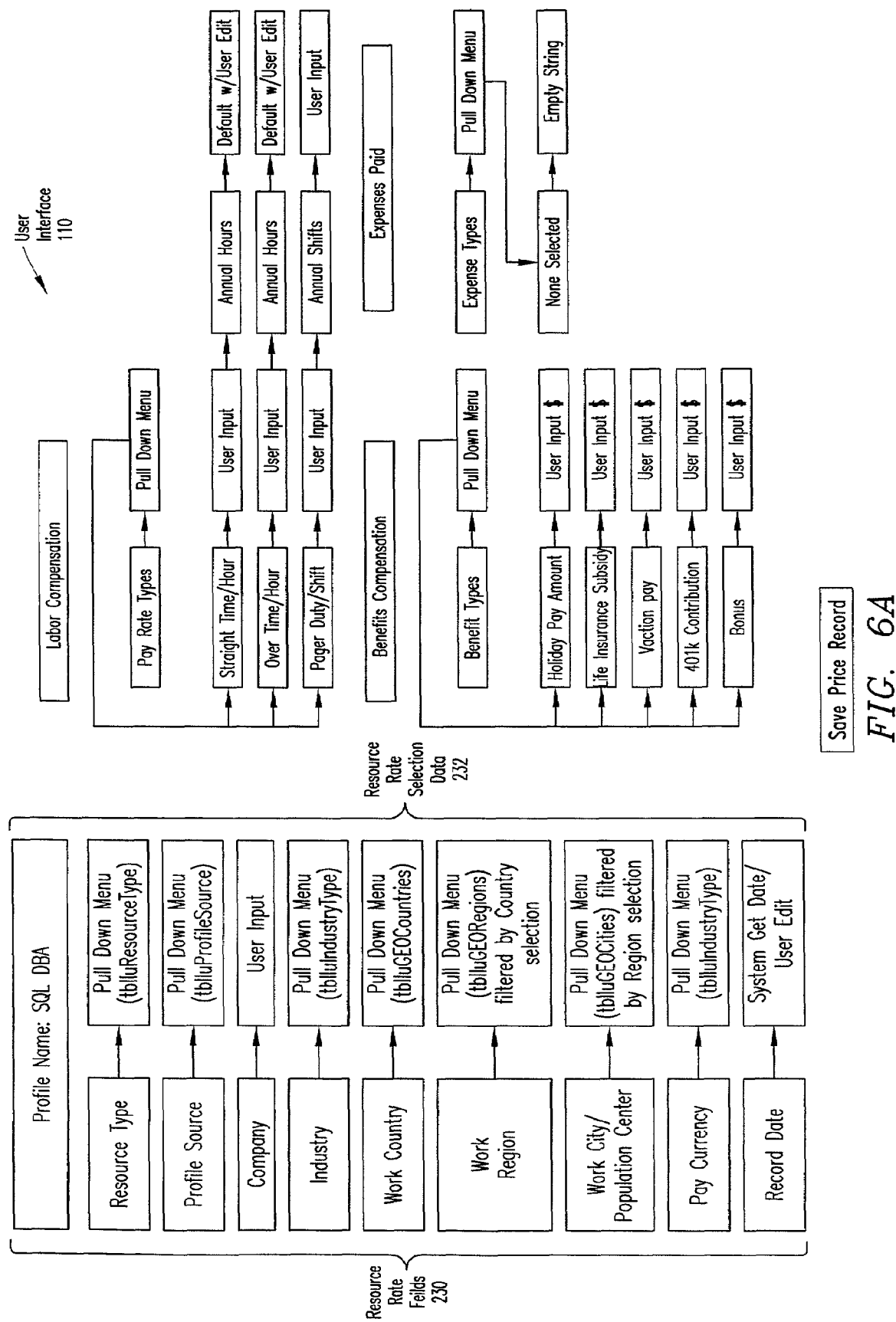
FIG. 6A illustrates an example of a user interface for entering various resource rate information through the use of resource rate fields and resource rate selection data.

FIG. 6A illustrates a sample user interface 110 for presenting resource rate selection data 232 to the user. The browser-based resource rate user interface 110 is table-driven, similar to the resource profile user-interface shown in FIGS. 5A-5H. The various resource rate fields 230 and associated resource rate selection data 232 can be displayed on one or more web pages to the user. In addition, the resource rate selection data 232 for each of the resource rate fields 230 can be provided to the user in a number of different formats. For example, the resource rate selection data 232 for the "Resource Type" field 220 can be presented to the user as a "pull down menu" containing all of the resource types for the user to select from (e.g., by clicking on one of the appropriate displayed resource type). As another example, the resource rate selection data 232 for the "Company" field 230 can be presented to the user as a space where the user can type in the company name.

In other examples, the user can be provided the option of selecting more than one of the resource rate selections 232 under a particular resource rate field 230 and/or entering additional information associated with one or more of the resource rate selections. For example, the resource rate selection 232 associated with the "Pay Rate Types" field 230 can be presented to the user as a pull-down menu of pay rate type selections, of which the user can select one or more of the pay rate type selections. When the user selects one of the pay rate type selections, the user can be further prompted for additional information about the selected pay rate type. As an example, if the user selects the "Over Time/Hour" pay rate selection, the user can be prompted to enter an hourly rate for over time and the total number of hours per year of over time associated with the resource. The "Annual Hours" resource rate selection data 232 can be presented to the user as a space for the user to enter an amount or a default amount with the option for the user to edit the default amount. The "Annual Hours" resource rate selection data 232 can be provided as a separate web page or as part of the web page displaying the pay rate types. Once the user has entered all of the resource rate information associated with the resource, the user can save the resource rate information (e.g., click on the "Save Price Record" button) to store the entered resource rate information in the resource record in the database.

Figure 6B:
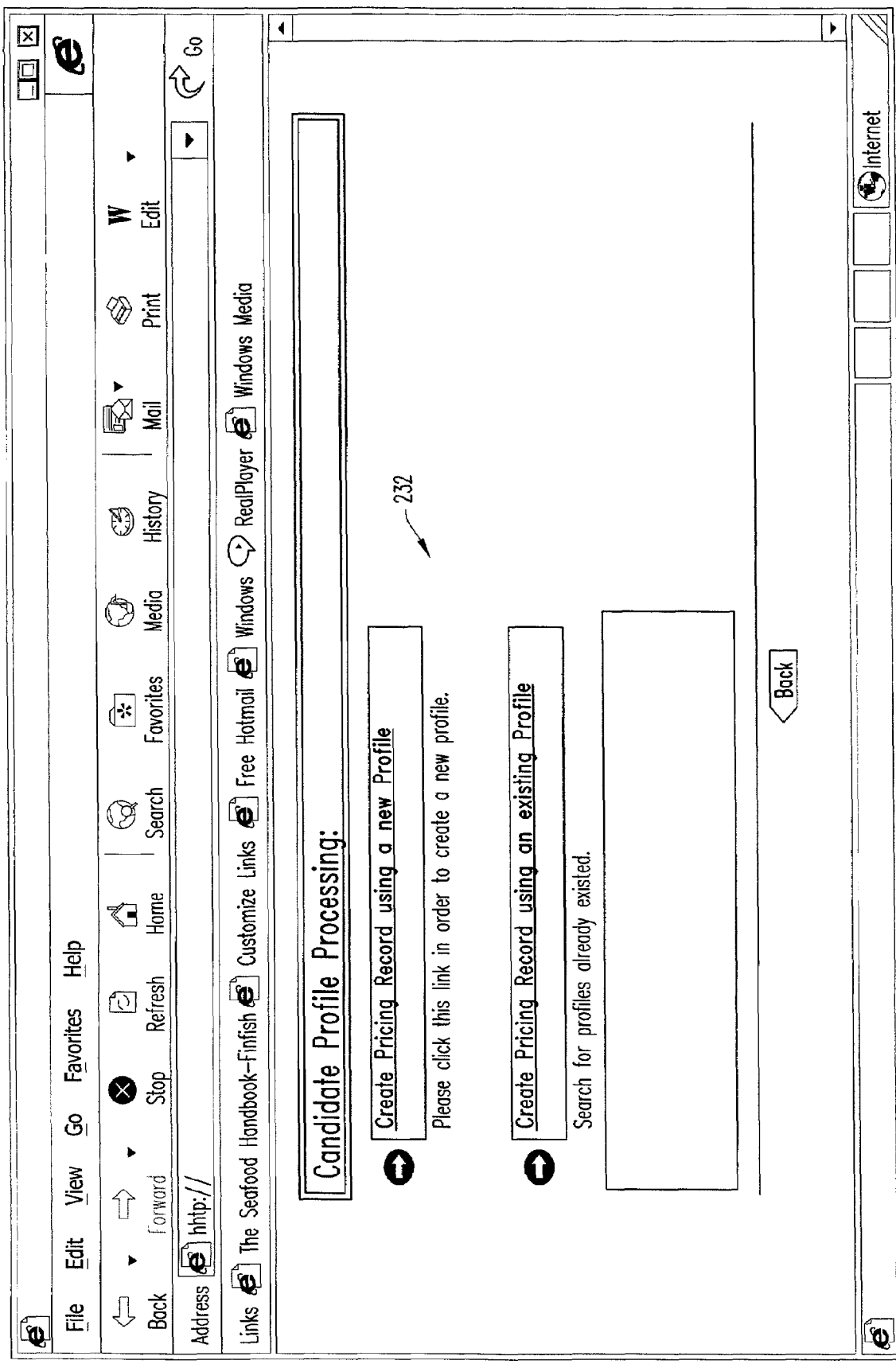
FIG. 6B is an exemplary screen shot of a sample web page that can be displayed during the resource rate creation process.

FIG. 6B is a screen shot illustrating a sample web page that can be presented to the user to create a resource record. As can be seen in FIG. 6B, the user can create a new resource record by entering the resource profile information (as shown in FIGS. 5A-5F), followed by the resource rate information associated with the resource profile information. Alternatively, the user can create a new resource record by using an existing resource profile (as shown in FIG. 5H), and entering the resource rate information associated with the existing resource profile information.

Examples of the types of resource rate fields 230 and resource rate selection data 232 that is provided to the user to select from are shown in Tables 4-8 hereinbelow. The resource rate fields 230 are illustrated for simplicity as being organized in a table format, with each table including all of the fields 230 necessary for displaying resource profile selection data 232 on a particular web page. The tables are related in a hierarchical and/or relational manner, such that the tables are accessed in a particular order.

TABLE 4 tblluResourceType

| Resource_Type_Name | ResourceTypeID |
|---|---|
| FTE | 1 |
| StaffSuppContractor | 2 |
| ProjectWorkResource | 3 |
| IndependentContractor | 4 |
| ContingentWorker | 5 |

TABLE 5 tblluProfileSource

| Profile_Source_Name | ProfileSourceID | Integrity Factor |
|---|---|---|
| ClientCorp | 1 | 1 |
| NewspaperAd | 2 | 3 |
| InternetBoard | 3 | 2.5 |
| JobFair | 4 | 2 |
| IntranetPosting | 5 | 1 |
| Survey | 6 | 2 |
| SisterConEmployee | 7 | 1 |
| GovtReport | 8 | 3 |

TABLE 6 tblluPayExpenseTypes

| Expense_Type_Name | ExpenseType10 |
|---|---|
| Per_Diem | 1 |
| Travel | 2 |
| Living | 3 |
| Auto_Mileage | 4 |
| Meals | 5 |
| Miscellaneous | 6 |

TABLE 7 tblluBenefitType

| Benefit_Name | BenefitTypeID |
|---|---|
| VacationPay | 1 |
| HolidayPay | 2 |
| SubsidizedHealthPlan | 3 |
| VehicleAllowance | 4 |
| 401KPlan | 5 |
| StockPlan | 6 |
| Profitsharing | 7 |
| SubsidizedLifeInsurance | 8 |
| TuitionSubsidy | 9 |
| PurchasingDiscounts | 10 |
| PaidTraining | 11 |
| Bonus | 12 |
| PaidSickDays | 13 |

TABLE 8 tblluPayRateTypes

| Labor_Type_Name | Labor_Type_ID |
|---|---|
| Straight_Time | 1 |
| Over_Time_At_Straight_Pay | 2 |
| Over_Time_At_Time_&_One_H | 3 |

TABLE 8-continued tblluPayRateTypes

| Labor_Type_Name | Labor_Type_ID |
|---|---|
| Over_Time_At_Double_Time | 4 |
| 1st_Shift | 5 |
| 2nd_Shift | 6 |
| 3rd_Shift | 7 |
| Weekend_Shift | 8 |
| Night_Shift | 9 |
| On_Call_Duty | 10 |
| Professional_Work_Day_10_Ho | 11 |
| Professional_Work_Day_12_Ho | 12 |
| Daily_Flat_Rate | 13 |
| NonBillable_Hours | 14 |
| Salary | 15 |

The resource profile fields 230 shown in Tables 4-8 above contain resource profile selection data 232 for soliciting resource rate information from the user to categorize the compensation information (e.g., wage rates, benefits and expenses) associated with a particular resource. As can be seen from Table 4, one type of resource rate information that can be solicited from the user is the "Resource Type," which indicates the type of resource that the rate information is associated with. For example, a "Resource Type" table can be accessed to retrieve resource rate selection data 232 associated with the "Resource Type" field 230 and display to the user the resource rate selection data 232 for the particular "Resource Type," such as: Full-Time Employee, Staff Supplementation Contractor, Project Work Contractor, Independent Contractor and Contingent Worker. The "Resource Type" table can further include a "Resource Type ID" field 230 listing the identification numbers within the computer system of each of the resource types. It should be understood that although not shown, the "Resource Type" table could also include an "ASP Display Order" field to indicate the display order of the resource types on the web page.

Table 5 above illustrates another type of resource rate information that can be solicited from the user. A "Profile Source" table is shown that includes a "Profile Source Name" field 230 that contains resource rate selection data 232 indicating the source of the resource rate information, such as: Client Corporation, Newspaper AD, Internet Board, Job Fair, Intranet Posting, Survey, Sister Company Employee or Government Report. The "Profile Source" table further includes a "Profile Source ID" field 230 listing the identification numbers within the computer system of each of the profile sources and a "Integrity Factor" field 230 listing an integrity factor associated with each of the profile sources. For example, the resource rate information collected from profile sources that provide actual compensation information for actual employees can have a higher integrity level than sources that provide advertised or surveyed compensation information. In this way, the statistical data generated from the resource rate information can be weighed depending upon the source (e.g., resource rate information collected from a client corporation can be weighted higher than resource rate information collected from a government report). Additional "Profile Source" tables (not shown) can be included to further identify the profile source. For example, additional tables can be used to solicit information about the specific profile source, such as the type of periodical, the issue date of the periodical, the name of the business entity, the location of business entity, the number of employees the business entity has and other source identifying data.

As a further example, Table 6 illustrates a "Pay Expense Type" table that includes a "Expense Type Name" field 220 containing resource rate selection data 232 indicating the types of expenses that the particular resource is compensated for, such as: Per Diem expenses, Travel expenses, Living expenses, Auto Mileage expenses, Meal expenses and other Miscellaneous expenses. Additional compensation information can include various benefits provided to the particular resource. To collect the benefit information, as shown in Table 7, a "Benefit Type" table can be accessed to retrieve a "Benefit Name" field 220 containing resource rate selection data 232 indicating various benefits associated with the particular resource. The particular pay or wage information associated with the resource can be collected by accessing a "Pay Rate Types" table that includes a "Labor Type Name" field 220 having resource rate selection data 232 indicating various types of pay structures, as shown in Table 8. The "Pay Expense Types" table, "Benefit Type" table and "Pay Rate Types" table can all further include an "ID" field that indicates the identification numbers within the computer system of the various expense types, benefit types and pay rate types.

Turning again to FIG. 3, all of the resource data 15 entered by the user (i.e., resource profile information 260 and resource rate information 270) and received at the web server 120 is stored in a resource record 250 within the database 150 (as described above in connection with FIG. 2). The resource profile information 260 and resource rate information 270 in the resource record 250 mirror the hierarchical and relational structure of the resource profile fields 220 and resource rate fields 230. Examples of the type of resource profile information 260 stored in the resource record 250 are illustrated hereinbelow in Tables 9-15.

TABLE 9 tblBusSector (Structure View)

| Column Name | Data Type | Length | Resource Profile Info |
|---|---|---|---|
| Business_Sector_ID | int | 4 | 4 |
| Business_Sector_Name | nvarchar | 50 | Technical |
| BS_ASP_Display | numeric | 9 | 1 |

TABLE 10 tblBusArena (Structure View)

| Column Name | Data Type | Length | Resource Profile Info |
|---|---|---|---|
| Business_Arena_ID | int | 4 | 13 |
| Business_Sector_ID | int | 4 | 4 |
| Business_Arena_Name | nvarchar | 50 | Management Information Systems |
| BA_ASP_Display | numeric | 9 | 20 |

TABLE 11 tblBusFamily (Structure View)

| Column Name | Data Type | Length | Resource Profile Info |
|---|---|---|---|
| Business_Family_ID | int | 4 | 78 |
| Business_Arena_ID | int | 4 | 13 |
| Business_Family_Name | nvarchar | 50 | Database Development |
| BF_AS_Display | numeric | 9 | 10 |

TABLE 12

TblBusGenFunctions (Structure View)

| Column Name | Data Type | Length | Resource Profile Info |
|---|---|---|---|
| Business_Family_ID | Int | 4 | 78 |
| General_Function_ID | Int | 4 | 3 |
| General_Function_Name | Nvarchar | 100 | Database Admin. |

TABLE 13

TblBusFamtoBusCat (Structure View)

| Column Name | Data Type | Length | Resource Profile Info |
|---|---|---|---|
| BusinessFamilyID | Int | 4 | 78 |
| Skills_Category_ID | Int | 4 | 2 |
| Skills Category | Nvarchar | 255 | Database |

TABLE 14

TblBusCategory (Structure View)

| Column Name | Data Type | Length | Resource Profile Info |
|---|---|---|---|
| Skills_Category_ID | Int | 4 | 2 |
| Skills_Category | Nvarchar | 255 | Database |

TABLE 15

TblBusSkills (Structure View)

| Column Name | Data Type | Length | Resource Profile Info |
|---|---|---|---|
| Skill_ID | Int | 4 | 7 |
| Skill_Name | Nvarchar | 255 | Informix |
| Skills_Category_ID | Int | 4 | 2 |

Tables 9-15 illustrate in table-format various tables that can include resource profile fields 220 and resource profile information 260 entered by the user for the resource. For example, in Table 9, the numeric identity 260 of the selected business sector can be stored in the "Business_Sector_ID" field 220, the selected business sector name 260 can be stored in the "Business_Sector_Name" field 220 and the ASP display order 260 of the selected business sector can be stored in the "BS_ASP_Display" field 220. Each field 220 includes resource profile information 260 of a certain data type (e.g., int, nvarchar, char, varchar, bit and datetime) and a certain length. Each of the subsequent Tables 10-15 includes not only further resource profile information 260, but also an identification of the previous resource profile information associated with the resource profile information included within the table. For example, the "Business Arena" table shown in Table 10 includes the "Business_Sector ID" field 220 and the associated identity 260 of the selected business sector in addition to the "Business_Arena_ID" field 220 and the associated identity 260 of the selected business arena.

Figure 7:
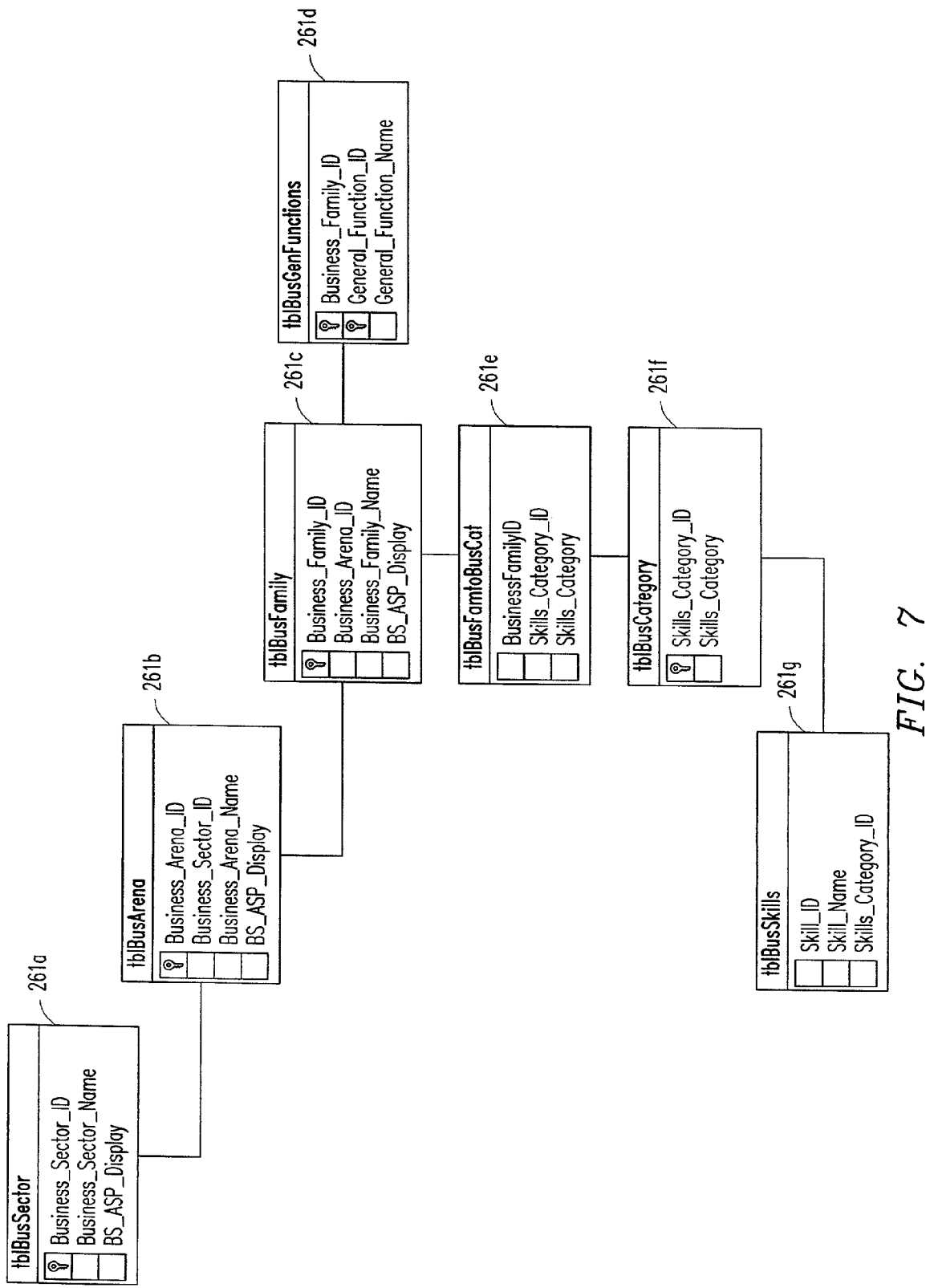
FIG. 7 is a database structure view illustrating a table-driven format for storing the various resource profile fields and resource profile information in a hierarchical and relational manner.

FIG. 7 is a database table-driven view illustrating the hierarchical relationship between the different types of resource profile fields 220 containing resource profile information (not shown) entered and stored in the resource records 250. The "Business Sector" table 261*a* is a top tier table, in that all other resource profile information is based on the resource profile information stored in the "Business Sector" table 261*a*. For example, the "Business Arena" table 261*b* is a second tier table to the "Business Sector" table 261*a* and the "Business Family" table 261*c* is a third tier table to the "Business Sector" table 261*a*. The "Business General Functions" table 261*d* and the "Business Family to Business Category" table 261*e* are both fourth tier tables to the "Business Sector" table 261*a*, and neither table 261*d* or 261*e* depend from each other. The "Business Category" table 261*f* and "Business Skills" table 261*g* further depend from the "Business Family to Business Category" table 261*e*, which correlates the selected business family to the one or more selected skills categories. It should be understood that there can be multiple "Business Family to Business Category" tables 261*e*, one for each of the selected skills categories, in order to correlate the selected business family with each of the selected skills categories. Examples of additional resource profile information that can be stored in the resource record 250 are shown in Tables 16-19 hereinbelow.

TABLE 16 tblProfileMaster (Structure View)

| Column Name | Data Type | Length | Resource Profile Info |
|---|---|---|---|
| ResourceProfileguid | int | 4 | 100 |
| ResourceProfileName | Varchar | 255 | Profile X |
| BusSectorID | Int | 4 | 4 |
| BusArenaID | Int | 4 | 13 |
| BusFamilyID | Int | 4 | 78 |
| User_Notes | Varchar | 1000 | User Notes |
| RecordDate | Datetime | 8 | dd/mm/yyyy |
| ProfileStatus | Char | 8 | Current |

TABLE 17

TblProfileMasterGFs (Structure View)

| Column Name | Data Type | Length | Resource Profile Info |
|---|---|---|---|
| ResourceProfileguid | Int | 4 | 100 |
| GeneralFunctionID | int | 4 | 10 |
| RecordID | int | 4 | 50 |

TABLE 18 tblProfileMasterSkills (Structure View)

| Column Name | Data Type | Length | Resource Profile Info |
|---|---|---|---|
| Resource_Profile_ID | int | 4 | 100 |
| Skill_ID | int | 4 | 30 |
| Record_ID | int | 4 | 50 |
| Skill_Priority | int | 4 | 2 |

TABLE 19 tblBusSkillPriority (Structure View)

| Column Name | Data Type | Length | Resource Profile Info |
|---|---|---|---|
| Skill_Priority_ID | int | 4 | 2 |
| Skill_Priority_Name | varchar | 50 | Critical |

Tables 16-19 above illustrate resource profile master information 260 that can be stored in the resource record in addition to the resource profile information 260 shown in Tables 9-15 above. For example, the resource profile master information 260 can include general information pertaining to the resource profile. In addition, the resource profile master information 260 can be used to store pre-configured resource profile information 260 to enable a user to associated resource rate information with the pre-configured resource profile information 260. As another example, the resource profile master information 260 can be used as a searching tool for searching resource records based upon requested resource profile information.

Table 16 shows a "Profile Master" table that contains a number of resource profile fields 220 and associated data entries 260 that provide basic resource profile information, such as the resource profile name, the business sector, arena and family identities of the resource and other basic identification information. Each resource profile field 220 within the "Profile Master" table is capable of supporting different data types (e.g., int, nvarchar, char, varchar, bit and datetime) and lengths. For example, the field 220 "BusSectorID" is capable of supporting an intermittent number of numeric values, depending upon business sector that the user selected to classify the resource. Other "master" tables can be associated with the "Profile Master" table, such as a "Profile Master GF" table shown in Table 17, which includes the resource profile field 220 "GeneralFunctionID" and the associated general function resource profile information 260 entered by the user in connection with the resource, a "Profile Master Skills" table shown in Table 18, which includes the resource profile field 220 "Skill_ID" and the associated skills resource profile information 260 entered by the user in connection with the resource and a "Business Skill Priority" table shown in Table 19, which includes the resource profile field 220 "Skill_Priority_ID" 220 and the associated priority resource profile information 260 of the skills resource profile information 260 stored in the "Profile Master Skills" table.

Figure 8:
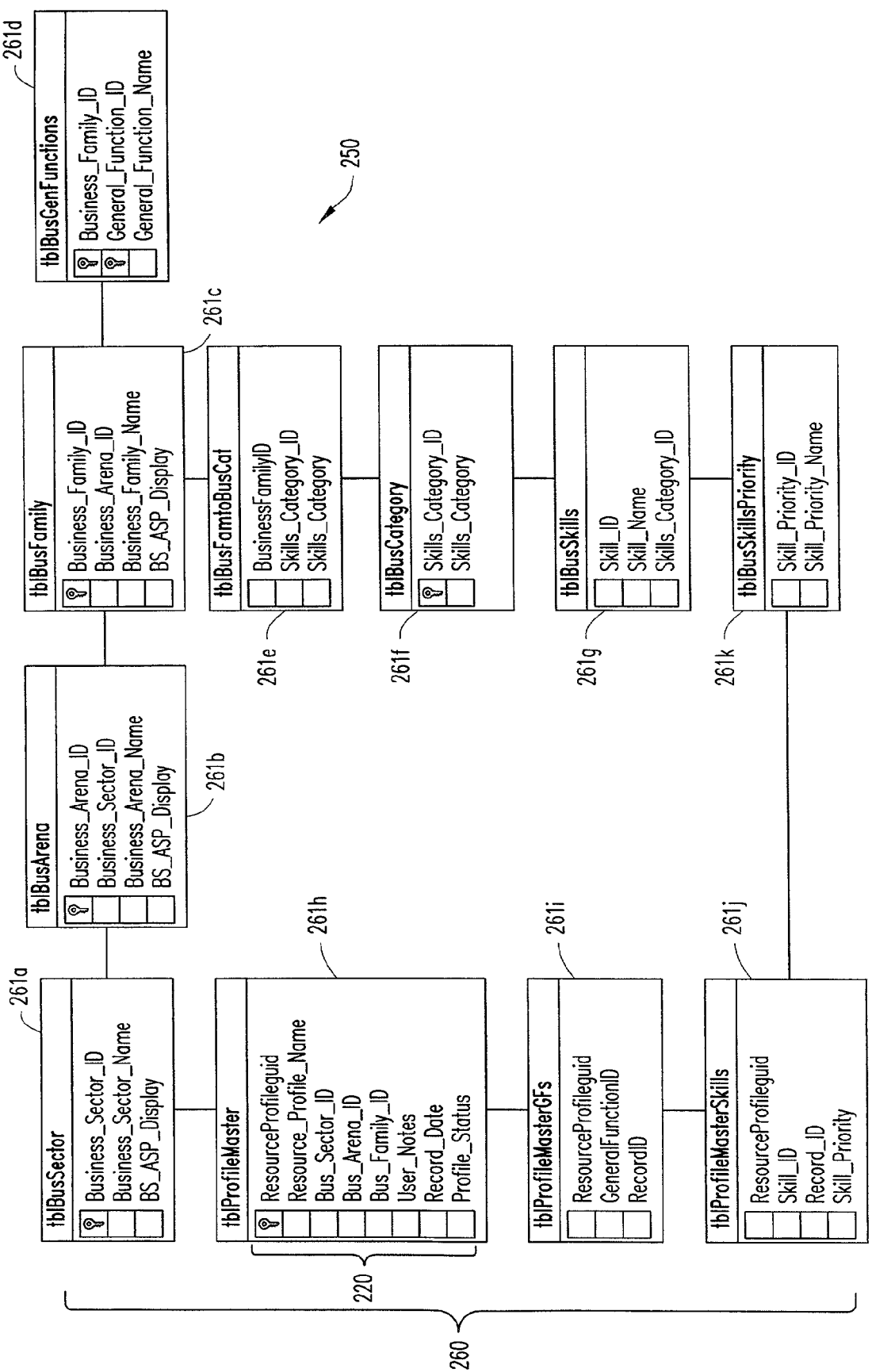
FIG. 8 is a database structure view illustrating the interrelation between the different types of resource profile information stored in the resource record.

FIG. 8 is a database table-driven view illustrating the interrelation between the resource profile master information and business skills resource profile information entered and stored in the resource records 250. The "Profile Master" table 261h is the top tier of resource profile information in FIG. 8, in that all other resource profile information is based on the "Profile Master" table 261h. For example, the "Profile Master GFs" table 261i and "Profile Master Skills" table 261j are second tier tables to the "Profile Master" table 261h, while the "Business Skills Priority" table 261k is a third tier table to the "Profile Master" table 261h. In addition, tables 261a-f are all related to the "Profile Master" table 261h and serve as constrained source data.

Examples of the type of resource rate information 270 (shown in FIG. 2) stored in the resource record are shown in Tables 20-23 hereinbelow.

TABLE 20 tblProfilePriceMaster (Structure View)

| Column Name | Data Type | Length | Resource Rate Information |
|---|---|---|---|
| ResourceProfileguid | int | 4 | 100 |
| Pricingguid | int | 4 | 200 |
| ResourceTypeID | int | 4 | 3 |
| IndustryTypeID | int | 4 | 4 |
| ProfileSourceID | int | 4 | 1 |
| WorkCountry | int | 4 | US |
| WorkRegion | int | 4 | NY |
| WorkCity | int | 4 | NYC |
| PricingIntegrityFactor | int | 4 | 1 |
| VendorID | int | 4 | XXX |
| OrderID | int | 4 | ZZZ |
| WorkStartDate | datetime | 8 | dd/mm/yyyy |
| WorkEndDate | datetime | 8 | dd/mm/yyyy |
| Expenses_Authorized | char | 1 | Y |

TABLE 20-continued tblProfilePriceMaster (Structure View)

| Column Name | Data Type | Length | Resource Rate Information |
|---|---|---|---|
| NonStraightTimePayAuthorized | char | 10 | No |
| FringeBenefitsAuthorized | char | 10 | No |
| TotalHourlyCompensation | money | 8 | $25 |
| TotalAnnualizedCompensation | money | 8 | $52,000 |
| CurrencyTypeID | int | 4 | 1 |
| ResourceName | varchar | 120 | Employee X |
| RecordDate | datetime | 8 | dd/mm/yyyy |

TABLE 21 tblProfilePriceRates (Structure View)

| Column Name | Data Type | Length | Resource Profile Info |
|---|---|---|---|
| Pricingguid | int | 4 | 100 |
| PayRateType | int | 4 | 15 |
| Rate | money | 8 | $50,000 |
| [%LaborPay] | float | 8 | |
| RecordID | int | 4 | 50 |

TABLE 22 tblProfilePriceBenefits (Structure View)

| Column Name | Data Type | Length | Resource Profile Info |
|---|---|---|---|
| Pricingguid | int | 4 | 100 |
| BenefitType | int | 4 | 12 |
| AnnualBenefitValue | money | 8 | $5,000 |
| RecordID | int | 4 | 50 |

TABLE 23 tblProfilePriceExpenses (Structure View)

| Column Name | Data Type | Length | Resource Profile Info |
|---|---|---|---|
| Pricingguid | int | 4 | 100 |
| RecordID | int | 4 | 50 |
| ExpenseTypeID | int | 4 | 6 |
| AnnualExpenseAmount | money | 8 | $1,000 |

Tables 20-23 above illustrates in table-format various tables that can include resource rate fields 230 and resource rate information 270 entered by the user for the resource. For example, Table 20 is a "Profile Price Master" table that includes resource rate master fields 230 that include resource rate master information 270. As an example, the "Profile Price Master" table is shown including the "ResourceTypeID" field 230 and the corresponding data entry 270 for the resource type identity (e.g., 3, which indicates that the resource type is "Project Work Contractor" from a reference to Table 4), the "ProfileSourceID" field 230 and the corresponding data entry 270 for the source identity (e.g., 1, which indicates that the source of the rate information is "Client Corporation" from a reference to Table 5), the "PricingIntegrityFactor" field 230 and the corresponding data entry 270 for the integrity factor associated with the rate information (e.g., 1, which is associated with the source of "Client Corporation" from a reference to Table 5), a "WorkCountryID" field 230, a "WorkRegionID" field 230 and a "WorkCityID" field 230 and the corresponding data entries 270 to define the country, region and city that the resource rate information is associated with and other master rate information 270. Each resource profile field 230 within the "Profile Price Master" table is capable of supporting different data types (e.g., int, nvarchar, char, varchar, bit and datetime) and lengths.

The resource rate information 270 can be further defined using other tables associated with the "Profile Price Master" table, such as a "Profile Price Rates" table shown in Table 21, which includes the resource rate field 230 "PayRateType" and the associated pay rate type resource rate information 270 entered by the user from the selections shown in Table 8, and the resource rate field 230 "Rate" and the associated actual wage rate 270 associated with the pay rate type entered by the user in connection with the resource. In addition, the benefit rate information can be defined using a "Profile Price Benefits" table shown in Table 22, which includes the resource rate field 230 "BenefitType" and the associated benefit type resource rate information 270 entered by the user from the selections shown in Table 7, and the resource rate field 230 "AnnualBenefitValue" and the associated actual annual benefit amount 270 associated with the benefit type entered by the user in connection with the resource. Furthermore, the expense rate information can be defined using a "Profile Price Expenses" table shown in Table 23, which includes the resource rate field 230 "ExpenseTypeID" and the associated expense type resource rate information 270 entered by the user from the selection shown in Table 6, and the resource rate field 230 "AnnualExpenseAmount" and the associated actual expense amount 270 associated with the expense type entered by the user in connection with the resource.

Figure 9:
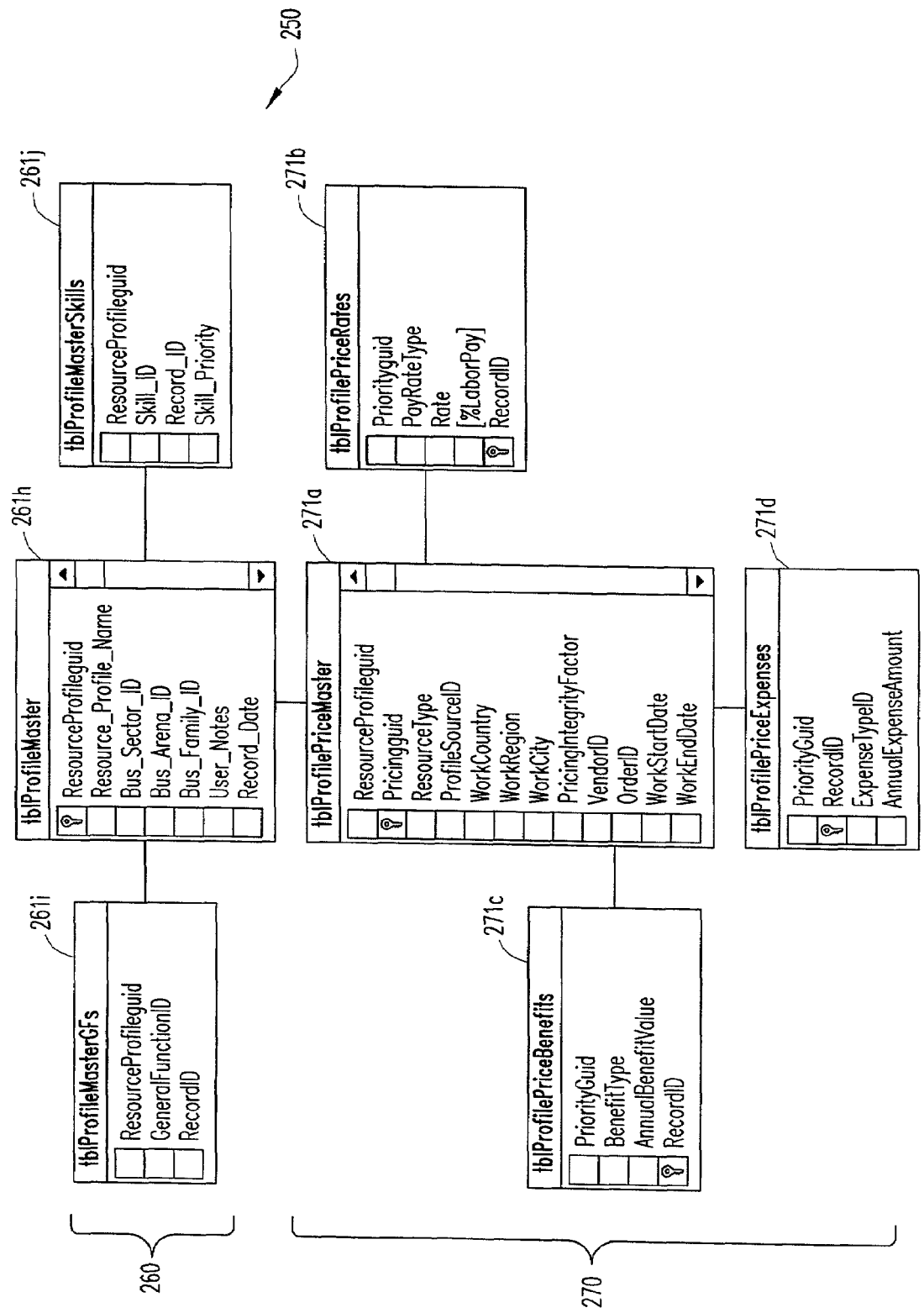
FIG. 9 is a database structure view illustrating a table-driven format for storing the various resource rate fields and resource rate information in a hierarchical and relational manner.

FIG. 9 is a database table-driven view illustrating the interrelation between the resource rate master information 270 stored in the "Profile Price Master" table 271a, other resource rate information 270 stored in other resource rate tables 271b-d and the resource profile master information 260 stored in the "Profile Master" table 261h, all of which are stored within a resource record 250. The "Profile Master" table 261h is the top tier of resource profile information 260, as discussed above, and the "Profile Price Master" table 271a is the top tier of resource rate information 270. The resource rate information 270 is associated with a particular resource profile 260 by associating the "Profile Master" table 261h with the "Profile Price Master" table 271a. The resource record 250 can further include additional resource profile tables (as shown in Tables 24-29 below), or if the profile master information 260 is used to store pre-configured resource profile information 260, the resource record 250 may only include the resource master tables 261h-j, and associate specific resource rate information 270 with the resource master information 260. Examples of additional resource rate information 270 that can be stored to further define the resource rate information 270 and enable different types of searching mechanisms are shown in Tables 24-29 hereinbelow.

TABLE 24 tblGEOCountries (Structure View)

| Column | Data Type | Length |
|---|---|---|
| Country_ID | int | 4 |
| Country_Name | nvarchar | 100 |
| Country_Abbreviation | nvarchar | 50 |
| Currency | nvarchar | 100 |
| [Currency_Code] | nvarchar | 100 |

TABLE 25 tblGEORegions (Structure View)

| Column | Data Type | Length |
|---|---|---|
| Region_ID | int | 4 |
| Region_Name | nvarchar | 50 |
| Region_Abbreviation | nvarchar | 4 |
| Region_Type | varchar | 50 |
| Country_ID | int | 4 |

TABLE 26 tblGEOCities (Structure View)

| Column | Data Type | Length |
|---|---|---|
| City_ID | int | 4 |
| City_Name | nvarchar | 255 |
| Region_ID | int | 4 |
| Country_ID | int | 4 |

TABLE 27 tblluIndustryTypes (Structure View)

| Column | Data Type | Length |
|---|---|---|
| IndustryTypeID | int | 4 |
| IndustyTypeDescription | varchar | 50 |

TABLE 28 tblCurrency (Structure View)

| Column | Data Type | Length |
|---|---|---|
| Currency_ID | int | 4 |
| Currency_Name | varchar | 255 |
| Currency_UniCode | char | 3 |

TABLE 29 tblProfileSource (Structure View)

| Column | Data Type | Length |
|---|---|---|
| ProfileSource_ID | int | 4 |
| ProfileSource_Name | varchar | 100 |
| IntegrityFactor | int | 4 |

For example, in addition to storing identification data 270 in the "WorkCountryID", "WorkRegionID" and "WorkCityID" fields 230 in the "Profile Price Master" table shown in Table 19 above, additional tables, such as Tables 24-26 above, can be included to store fields 230, such as the "Country_Name", "Region_Name", "City_Name" and other searchable criteria fields, to enable a user to search for rate information 270 associated with a particular resource profile 260 within a particular geographic area 270. Likewise, other tables, such as Tables 27-29 above, can be included to further define additional searchable parameters for various other resource rate information 270.

For example, an "Industry Types" table shown in Table 28 can be included to store the "IndustryTypeID" field 230 and associated data entry and an "IndustryTypeDescription" field 230 and associated data entry. Therefore, a user can search for resource rate information 270 associated with a particular resource profile 260 within a particular industry or across multiple industries. As another example, a "Currency" table shown in Table 28 can be included to store the "Currency_ID" field 230 and associated data entry, "Currency_Name" field 230 and associated data entry and "Currency_Unicode" field 230 and associated data entry. Therefore, when a user searches for rate information 270 associated with a particular resource profile 260, the user can have the rate information displayed in any currency that the user desires, and all rate information 270 can be equally processed by converting between currency amounts at the current currency exchange rate. As a further example, a "Profile Sources" table shown in Table 27 can be included to store the "ProfileSourceID" field 230 and associated data entry, "Profile_Source_Name" field 230 and associated data entry and "Pricing_Integrity_Factor" field 230 and associated data entry. Therefore, when the computer system uses the rate information stored in a particular resource record as part of a statistical analysis, the computer system can weigh the rate information using the pricing integrity factor as a consideration of where the resource rate information originated from.

It should be understood that the amount of resource rate information 270 stored in the resource record is not limited to the specific resource rate information 270 described herein, but instead is intended to include any resource rate information 270 that may be applicable for a particular industry-sector. In addition, it should be understood that the organizational relation between various resource rate information 270 is not limited to the table-format described herein, but instead is intended to include any organizational relation that allows searching of resource rate information 270 for particular resource profile information 260.

Figure 10:
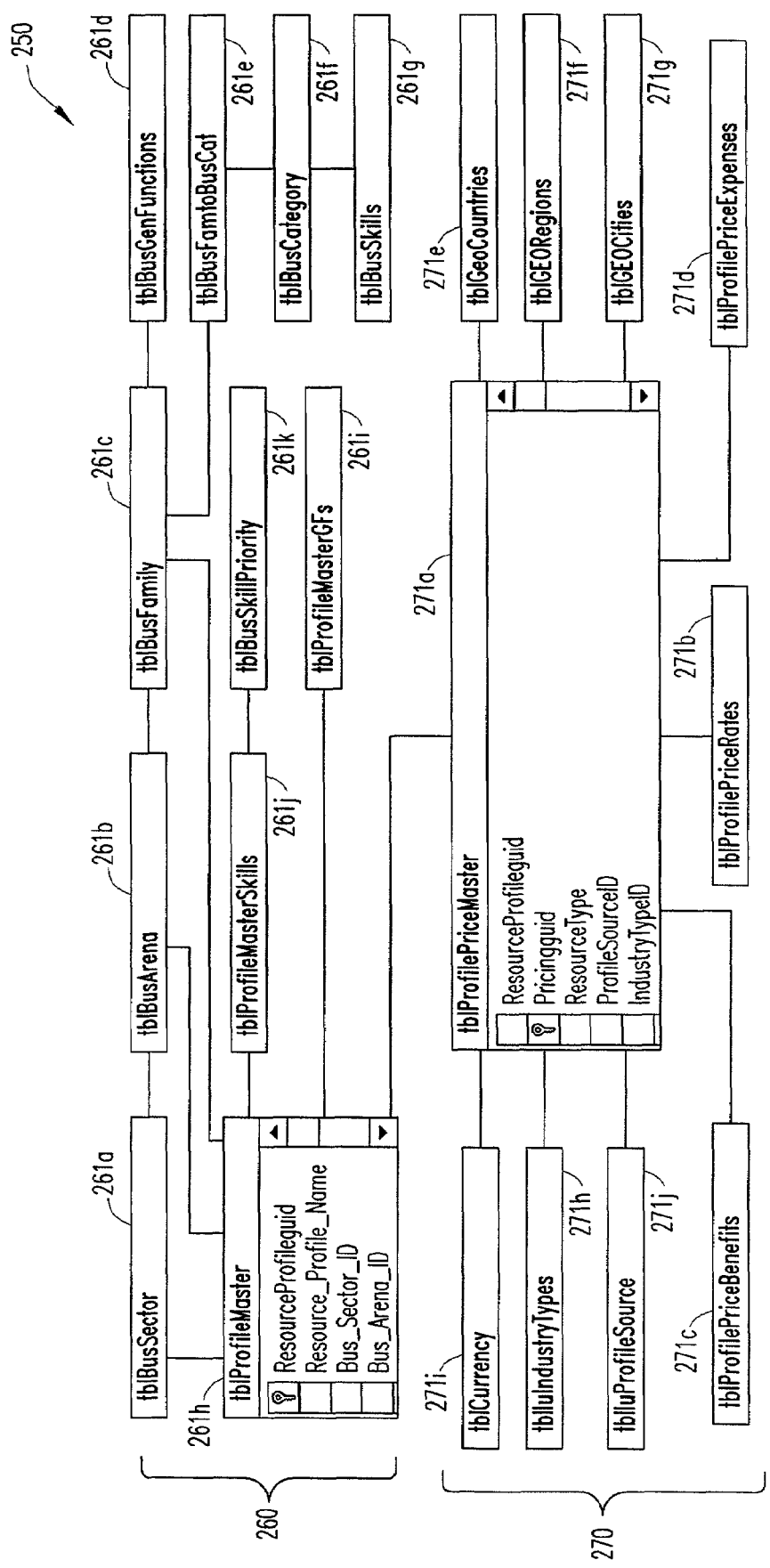
FIG. 10 is a database structure view illustrating additional resource rate fields and the interrelation between the various types of resource profile information and resource rate information stored in the resource record.

FIG. 10 is a database table-driven view illustrating the interrelation between the resource rate master information 270 stored in the "Profile Price Master" table 271a, other resource rate information 270 stored in other resource rate tables 271b-j, the resource profile master information 260 stored in the "Profile Master" tables 261h-k and other resource profile information 260 stored in other resource profile tables 271a-g, all of which are stored within a resource record 250.

Figure 11:
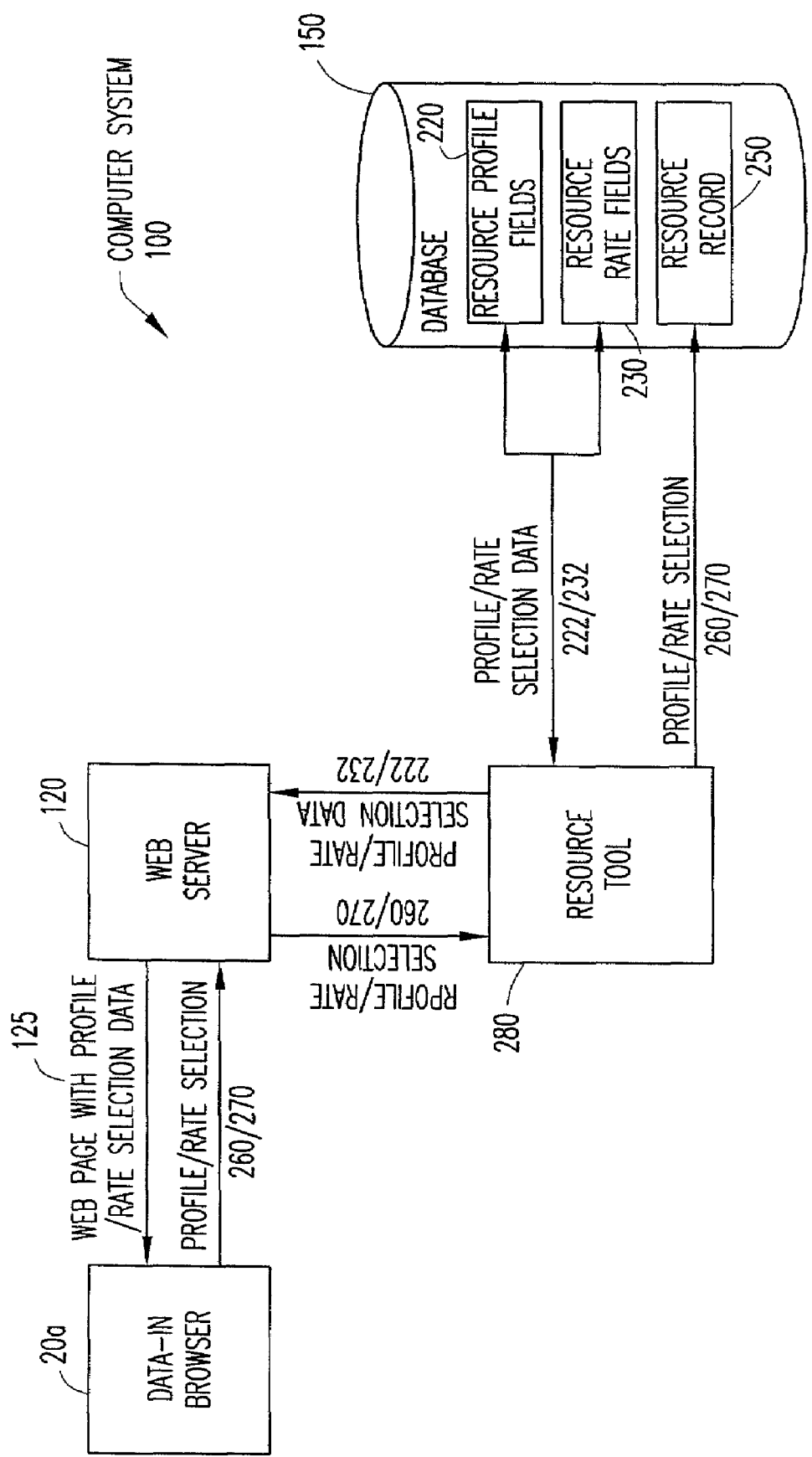
FIG. 11 is a data flow diagram illustrating a resource tool for creating resource records, in accordance with embodiments of the present invention.

FIG. 11 is a data flow diagram illustrating a resource tool 280 for enabling a user to create a resource record 250. The resource tool 280 can include any hardware, software and/or firmware required to perform the functions of the resource tool 280, and can be implemented within the web server 120 or an additional server (not shown). Each time a user accesses the computer system 100 to create a new resource record 250 or update an existing resource record 230, the resource tool 280 retrieves resource profile selection data 222 from the resource profile fields 220 stored in the database 150 or resource rate selection data 232 from the resource rate fields 230 stored in the database 150 and passes the resource profile selection data 222 or resource rate selection data 232 to the web server 120 to populate in one or more web pages 125 to be presented to the user via a data-in browser 20a.

The user enters one or more profile selections 260 or rate selections 270 based on the resource profile selection data 222 or resource rate selection data 232, and the web server 120 passes the profile selections 260 or rate selections 270 to the resource tool 280 for storage within the resource record 250. Based upon the profile selections 260 or rate selections 270, the resource tool 280 further accesses the database 150 for new resource profile selection data 222 or new resource rate selection data 232 for populating subsequent web pages 125 within the web server 120 to be presented to the data-in browser 20a.

Figure 12:
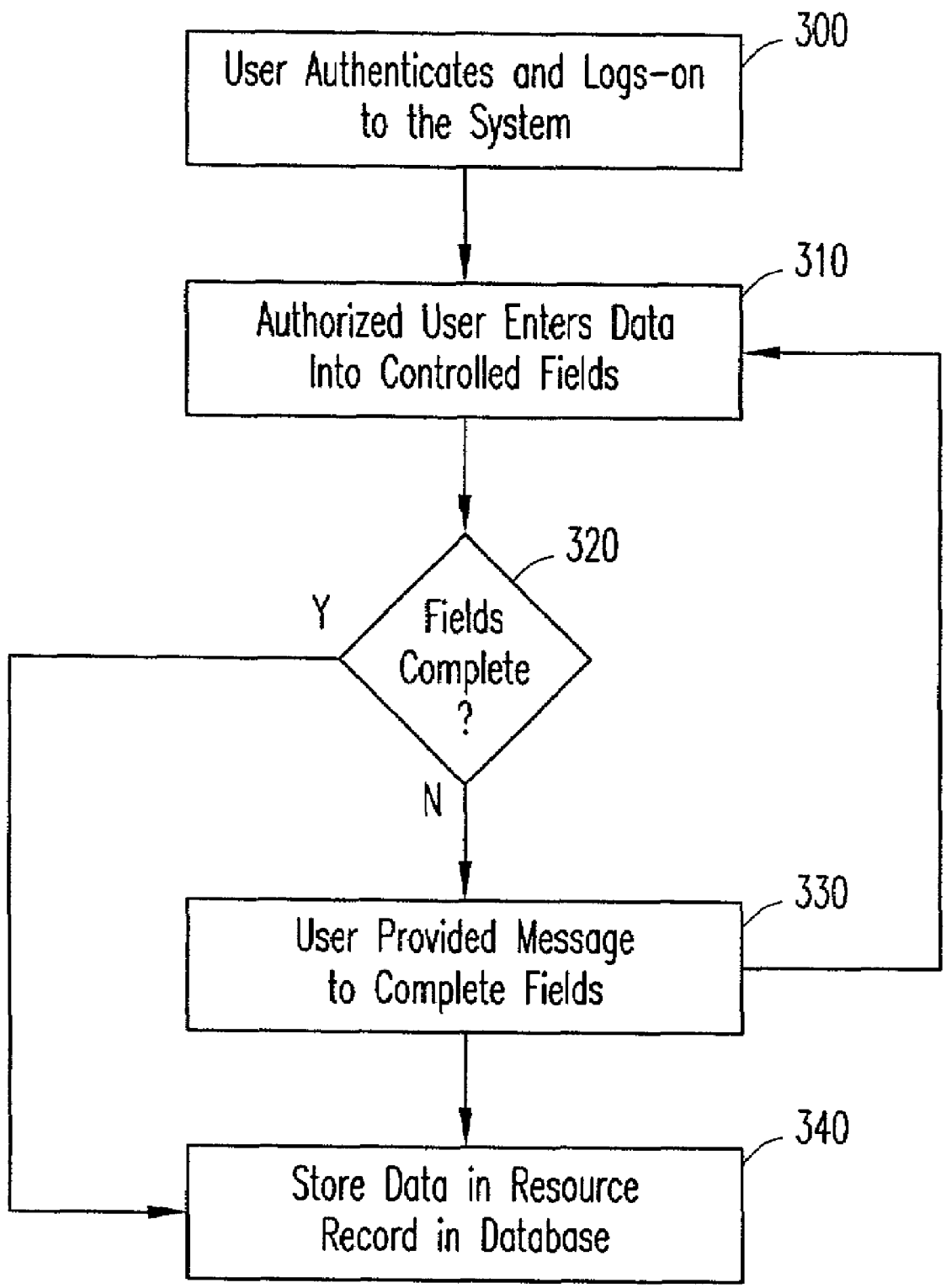
FIG. 12 is a flowchart illustrating exemplary steps for creating a resource record, in accordance with embodiments of the present invention.

FIG. 12 is a flowchart illustrating exemplary steps for entering resource profile information and resource rate information into a resource record in the database, in accordance with embodiments of the present invention. Initially, a user accesses the computer system and logs-in using, for example, a user name and password, to authenticate the user to the computer system (step 300). The user name and/or password can be unique to each user, or one user name and password can be associated with all users at a particular source (e.g., business entity). Once the user has been authenticated, the user can enter resource profile information and resource rate information into the computer system (step 310) using the user interface, as described above in connection with FIGS. 4-6. For example, the user can be prompted to enter resource profile information in the hierarchical manner described above in connection with FIGS. 5A-5F by pushing web pages populated with resource profile selection data to the user and storing received resource profile information into fields within the resource record. Once the resource profile information has been entered, or once the user has associated a particular pre-configured resource profile with the resource record, as shown in FIG. 5H, the user can be prompted to enter resource rate information using the user interface described above in connection with FIGS. 6A-6B. Alternatively, if the user is updating an existing resource record, the user can be prompted to indicate the type of information the user would like to update (e.g., resource profile information or resource rate information), and in response, the computer system can push web pages to the user having resource profile selection data or resource rate selection data associated with only the information that the user would like to update.

There are certain resource profile fields and/or resource rate fields that the computer system may require all users to fill out, such as the business sector, arena and family, or the pay rate type and actual wage rate associated with the resource. If the user does not fill out one or more of the required fields (step 320), the computer system prompts the user to fill out those required fields (step 330). Once all of the required fields are complete (step 320), the computer system provides the user with a message indicating that the resource record (new or changed) has been received and stored in the database (step 340). For example, the user can be provided with a web page similar to the web page shown in FIG. 5G to summarize the entered resource profile information, and on the same web page or a different web page, a summary of the resource rate information entered by the user.

Figure 13:
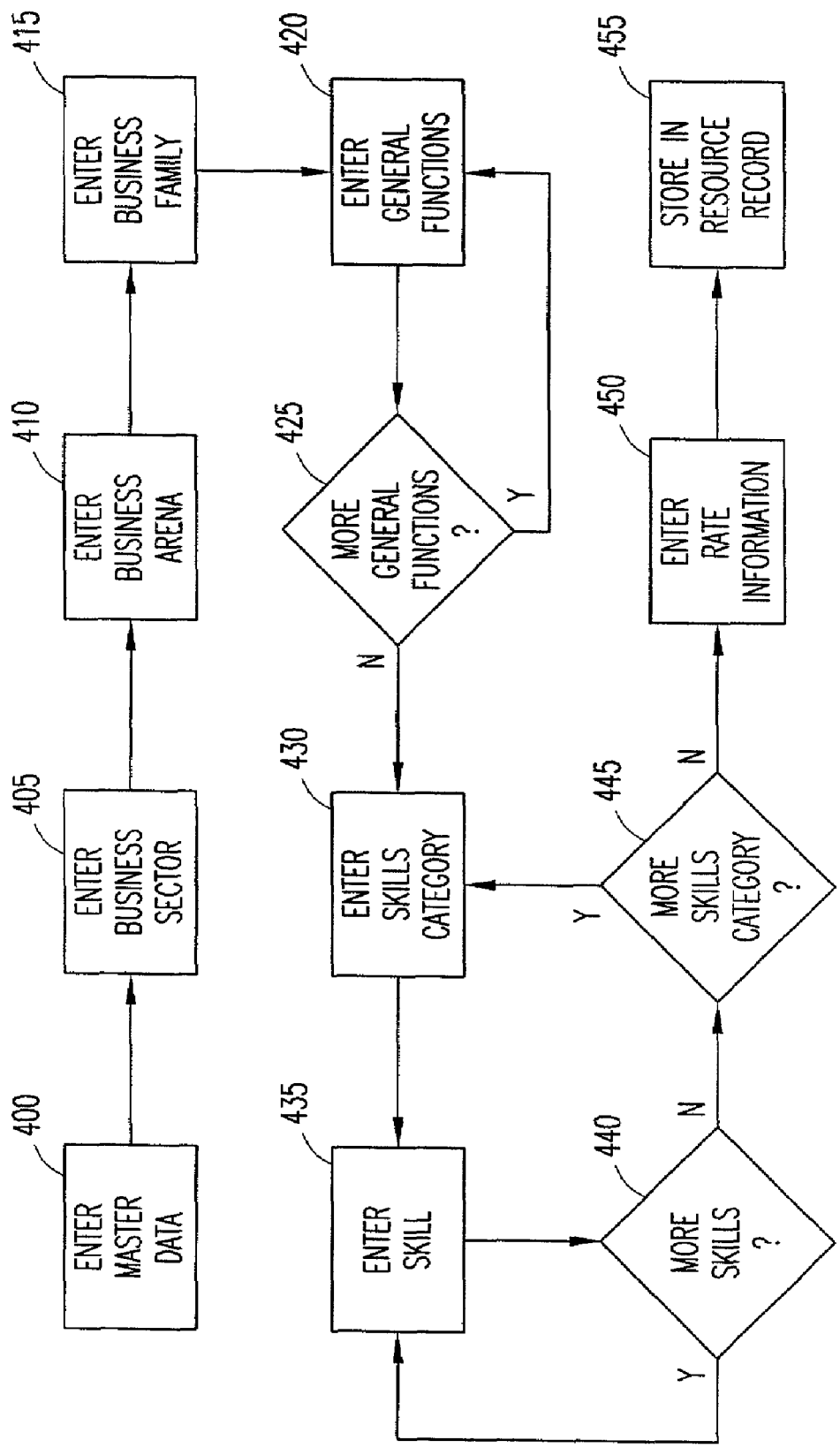
FIG. 13 is a flowchart illustrating exemplary steps for entering resource profile information and resource rate information, in accordance with embodiments of the present invention.

FIG. 13 shows the steps for entering all of the specific resource profile information described above in connection with FIGS. 5A-5F and resource rate information into the resource record. As a first step, a user enters the master data associated with the resource, such as the resource profile name (e.g., Employee X) and resource profile source (e.g., Business A) (step 400). Thereafter, the user enters the business sector (step 405), business arena associated with the business sector (step 410) and business family associated with the business arena (step 415) to define the job category of the particular resource. To further define the level of skill of the particular resource, the user enters the general functions associated with the resource (step 420). Once all of the general functions have been entered (step 425), the user enters a skills category associated with a particular type of skill that the resource possesses (step 430). For each skills category entered by the user, the user further defines the specific experience the resource has by entering one or more skills under that skills category (step 435). Once all of the skills for a particular skills category have been entered (step 445), the user moves to the next skills category (steps 445 and 430) to enter all of the skills associated with that skills category (steps 435 and 440). After all of the skills for each of the skills categories associated with the business family of the resource have been entered (step 445), to complete the resource profile information, the user enters rate information associated with the resource profile information (step 450). Thereafter, the resource profile information and associated resource rate information are stored within a resource record in the database (step 455).

Figure 14:
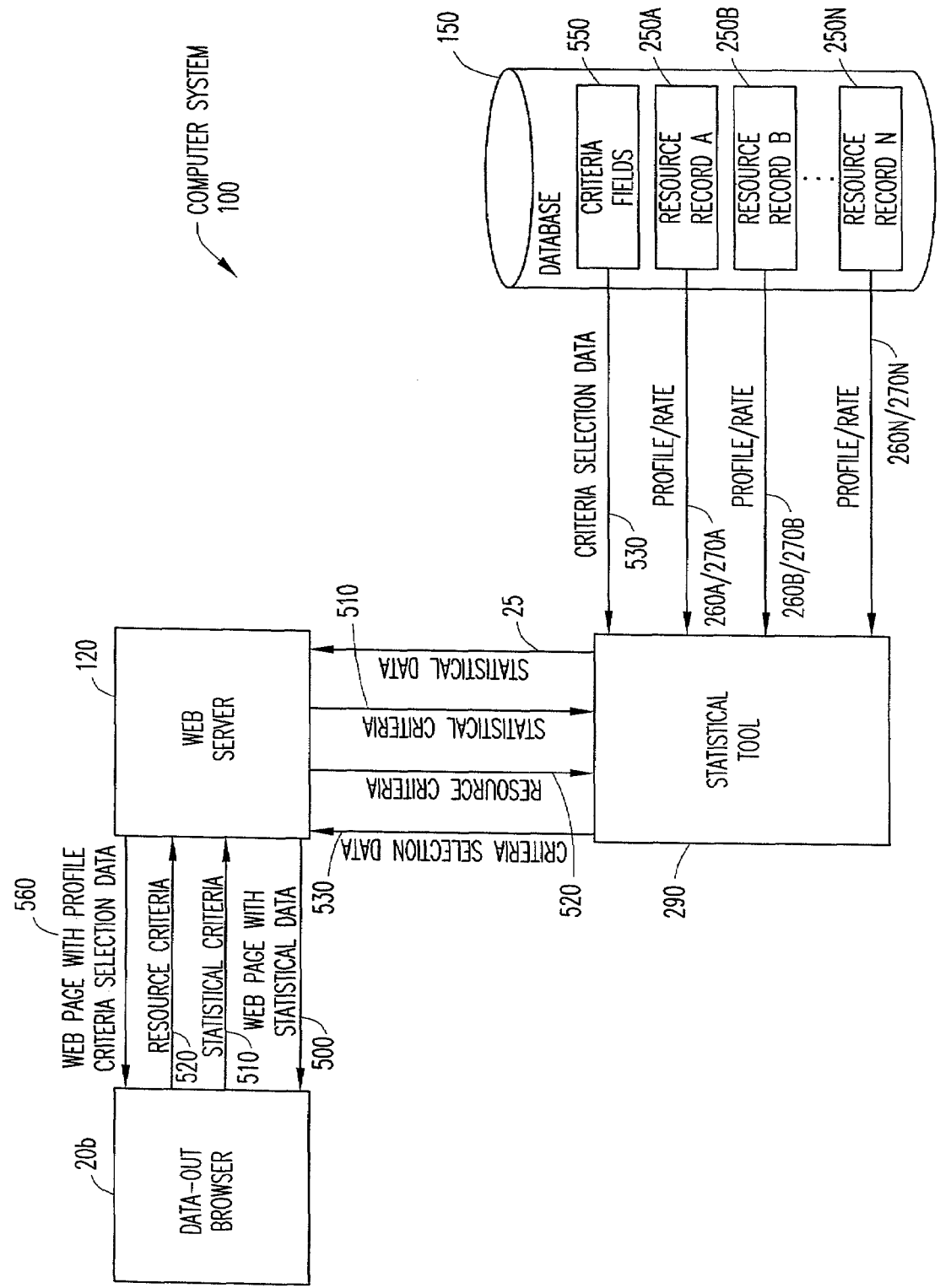
FIG. 14 is a data flow diagram illustrating a statistical tool for calculating and providing statistical data related to one or more resource records, in accordance with embodiments of the present invention.

FIG. 14 is a data flow diagram illustrating a statistical tool 290 for matching resource profile information 260 stored within the database 150 to resource criteria 520, and calculating requested resource rate statistical data 25 associated with matching resource profile information 260, in accordance with embodiments of the present invention. The statistical tool 290 can include any hardware, software and/or firmware required to perform the functions of the statistical tool 290, and can be implemented within the web server 120 or an additional server (not shown). When a user (requestor) accesses the computer system 100 using a data-out browser 20b, the computer system 100 solicits resource criteria 520 from the user. The resource criteria 520 can be entered in the same manner as the resource profile information 260 stored in the resource records 250 in the database 150. For example, the statistical tool 290 can interface with the database 150 to retrieve criteria fields 550 containing criteria selection data 530 and populate one or more web pages 560 within the web server 120 with the criteria selection data 530 to be passed to the data-out browser 20b, so that the user can enter the specific resource criteria 520 that the user would like statistical information on. It should be understood that the criteria selection data 530 can include either multiple resource profile selections that can be individually selected or one or more pre-configured resource profiles. The criteria selection data 530 and entered resource criteria 520 can further include various resource rate information, such as the particular pay rate type, benefit type, expense type, geographic area, industry, currency type, data sources and data record dates (e.g., only records created during the past twelve months), that the user desires.

The resource criteria 520 are passed from the web server 120 to the statistical tool 290 to compare the entered resource criteria 520 to the resource records 250 stored in the database 150. The statistical tool retrieves resource profile information 260A, 260B, . . . 260N and resource rate information 270A, 270B, . . . 270N from the resource records 250A, 250B, . . . 250N, respectively to determine if the resource criteria 520 match any of the resource records 250A, 250B, . . . 250N. The user can designate that all entered resource criteria 520 must match exactly before a particular resource record 250 is used in the statistical analysis, or the user can specify a minimal match percentage (e.g., 75% of the resource criteria 520 must match a resource record 250 for that resource record 250 to be used in the statistical analysis). Alternatively, the computer system 100 can determine a minimal match percentage or other matching criteria (e.g., up to business family with at least one general function and at least one skill) before using a resource record 250 in the statistical analysis. The computer system 100 can further inform the user of the matching criteria used to enable the user to narrow or broaden the matching criteria accordingly as part of the resource criteria 520.

If the resource profile information (e.g., 260A) and resource rate information 270A within a particular resource record 250A matches the entered resource criteria 520 based upon the matching criteria, the statistical tool 290 uses the resource rate information 270A within the resource record 250 to calculate statistical data 25 related to the resource criteria 520. The statistical data 25 can be default statistical data 25 set by the computer system, or can be specific statistical data 25 requested by the user. For example, in addition to entering the resource criteria 520, the user can enter statistical criteria 510 into the computer system 100. To enter the statistical criteria 510 into the computer system 100, the criteria selection data 530 can further include statistical selections that can be populated in web pages 560 and provided to the data-out browser 20b from the web server 120 for the user to select from.

The statistical selections 530 provided to the user can be generic (e.g., the user can select to have statistical data on pay rates, benefits, expenses and other compensation information) regardless of the resource criteria 520 entered by the user, or the statistical selections 530 can be based upon the resource criteria 520 entered by the user. For example, if the user selected a particular benefit type, the user can be prompted to enter whether the user would like to have statistical data 25 related to that particular benefit type. The statistical criteria 510 entered by the user can relate to not only the types of data that the statistical tool 290 can use, but also the types of calculations the statistical tool 290 can make. For example, the statistical criteria 510 can instruct the statistical tool 290 to calculate the average pay rate across all geographical areas, the average pay rate for specific geographic areas, the average pay rate for a specific industry or multiple industries, the standard deviation, the pay rate range and any other statistical data 25 that the user desires.

The statistical tool 290 further interfaces with the web server 120 to provide a web page 500 containing the requested statistical data 25 to the data-out browser 20b. Based upon the statistical data 25 received, the statistical tool 290 can further provide the user the option of modifying the resource criteria 520 and/or the statistical criteria 510 to narrow or broaden the number of resource records 280 included within the statistical data 25 or modify the type of statistical data 25 provided on the web page 500 displayed to the user via the data-out browser 20b. In addition, if the resource criteria 520 entered by the user are too broad to perform a manageable search, the statistical tool 290 can request the user to modify the resource criteria 520. For example, the statistical tool 290 can suggest that the user enter more general functions and/or skills to perform the search. Furthermore, if the resource criteria 520 are too narrow, such that few or no matches occur, the statistical tool 290 can request the user to modify the resource criteria 520. For example, the statistical tool 290 can suggest that the user broaden the geographical area or industry or remove the specific benefit type that the user requested.

Figure 15A:
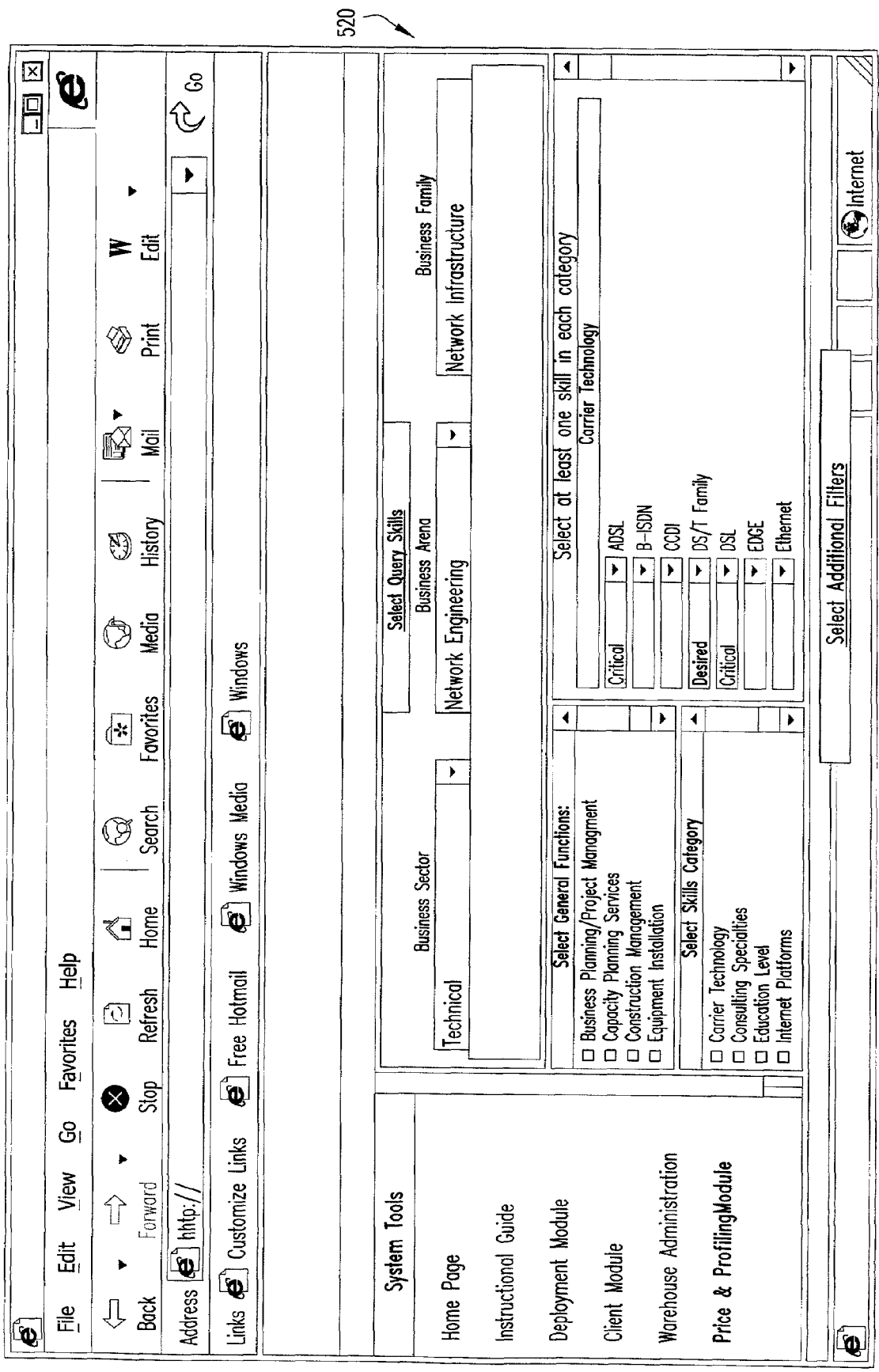

An example of the resource criteria 520 used by the statistical tool 290 to compare to resource records 250 is illustrated in FIGS. 15A and 15B. FIG. 15A is a screen shot of an exemplary web page 560 that can be provided to the user to choose the resource profile information of the resource criteria 520. For example, in FIG. 15A, the user has selected the "Technical" business sector, the "Network Engineering" business arena and the "Network Infrastructure" business family. In addition, the user has selected several general functions, skills categories and skills within each of the skills categories. FIG. 15B is a screen shot of an exemplary web page 560 that can be provided to the user to choose the resource rate information of the resource criteria 520. For example, in FIG. 15B, the user has selected the "United States" as the country, "New York" as the region and "Manhattan" as the city. The user has further selected a particular resource type (e.g., FTE), an industry (e.g., telecommunications), a record date span (e.g., a twelve month period) and a minimal match percentage (e.g., 75%).

An example of a web page 500 containing statistical data 25 calculated by the statistical tool using the entered resource criteria 520 and provided to the user is shown in FIG. 15C. FIG. 15C is a screen shot of an exemplary web page 500 listing various statistical data 25. For example, the user can be provided a total number of records that matched the resource criteria entered by the user, along with various statistical data 25 associated with the resource rate information stored in the matching resource records. In addition, the user can be provided the option to modify the statistical criteria (shown as a "Edit Industry Data" button) or modify the resource criteria (shown as a "Edit Query Filters" button). Furthermore, the user can be provided with the option of viewing the specific resource criteria 520 that matched resource records (shown as a "View Matched Skills" button). An example of a view showing the resource criteria 520 entered by the user that matched resource records is illustrated in FIG. 15D.

Figure 16:
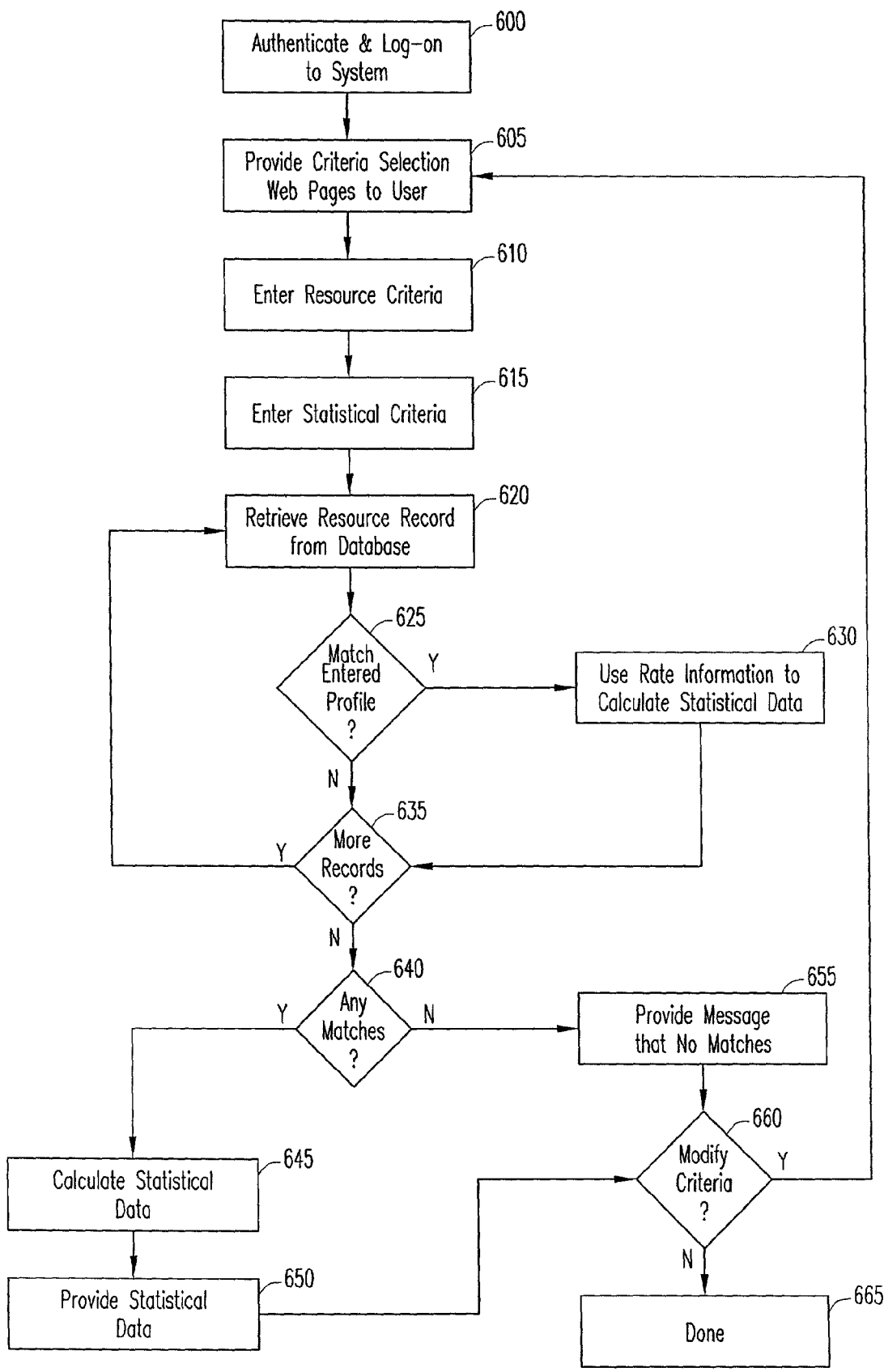
FIG. 16 is a flowchart illustrating exemplary steps for calculating and providing statistical data related to one or more resource records, in accordance with embodiments of the present invention.

FIG. 16 is a flowchart illustrating exemplary steps for calculating and providing resource rate statistical data related to one or more resource records, in accordance with embodiments of the present invention. Initially, a user accesses the computer system and logs-in using, for example, a user name and password, to authenticate the user to the computer system (step 600). The user name and/or password can be unique to each user, or one user name and password can be associated with all users at a particular source (e.g., business entity). Once the user has been authenticated, one or more web pages containing criteria selection data are pushed to the user's browser for the user to select from (step 605). Based upon the criteria selection data displayed on the web page(s), the user enters resource criteria (step 610) and statistical criteria (step 615) into the computer system, as described above. For example, the user can be prompted to enter resource criteria including resource profile information and resource rate information in the hierarchical manner described above in connection with FIGS. 15A-15B or by requesting a particular pre-configured resource profile.

Once the resource criteria and statistical criteria have been entered, the computer system retrieves a resource record from the database (step 620) and compares the resource criteria to the resource profile information and resource rate information stored in the resource record to determine if the resource record matches the resource criteria (step 625), in accordance with the matching criteria entered by the user as part of the resource criteria or pre-configured by the computer system. If the resource record matches the resource criteria, the resource rate information included within the resource record is used to calculate statistical data in accordance with the statistical criteria entered by the user. This process is repeated for each resource record in the database (step 635).

If, after comparing each resource record to the resource criteria, there are no resource records that match the resource criteria (step 640), the computer system provides a message to the user that there are no matching records (step 655), and the user is provided the option of modifying the resource criteria (e.g., broaden the geographical area constraints, remove one or more specific skills or general functions, etc.) in an attempt to locate one or more resource records that meet the new resource criteria (step 660). If the user does not wish to modify the resource criteria, the process ends.

However, if there are one or more resource records that match the resource criteria, the computer system uses all of the matching resource records to calculate the requested statistical data (step 645), as evidenced by the statistical criteria entered by the user. The calculated statistical data is provided to the user for viewing, downloading or printing by the user (step 650). The user is further provided the option of modifying the resource criteria and/or statistical criteria (step 660) to broaden or narrow the number of matching resource records in order to obtain more accurate statistical data or different statistical data. If the user is satisfied with the statistical data, and therefore does not choose to modify the resource criteria and/or statistical criteria, the process ends (step 665).

Figure 17:
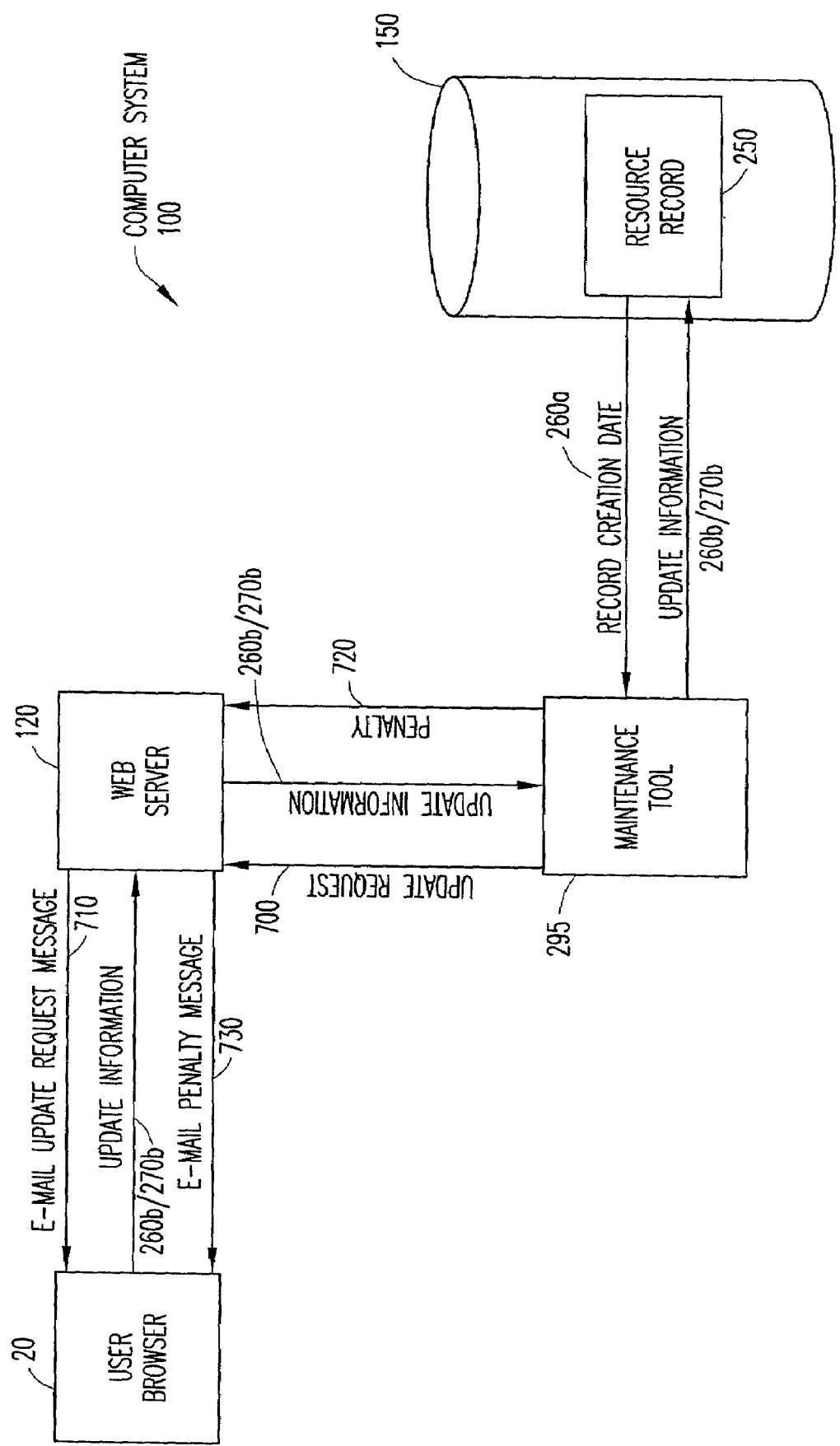
FIG. 17 is a data flow diagram illustrating a maintenance tool for updating resource records, in accordance with embodiments of the present invention.

FIG. 17 is a data flow diagram illustrating a maintenance tool 295 for maintaining current resource records 250, in accordance with embodiments of the present invention. Each resource record 250 has a "Record Date" field therein (e.g., the "Profile Price Master" Table 20 above contains a "Record Date" field) that stores a record creation date 260a that identifies the date that the resource record was created by the user. The maintenance tool 295 within the computer system 100 interfaces with the database 150 to retrieve the resource creation date 260 stored within the resource records 250, and make a determination of whether the resource record should be updated. The maintenance tool 140 includes the hardware, software and/or firmware required to perform the functions of the maintenance tool 140, and can be included within the web server 120 or an additional server (not shown).

The determination of whether the resource record should be updated can be made based upon a number of factors. For example, the maintenance tool 295 can further retrieve the source of the resource record from the "Profile Source" field (shown in Tables 20 and 28 above) to determine whether or not the resource record should be updated. As an example, if the source of the resource record is a job fair or publication, there would be no need to update the particular resource record, as this information is one-time only. As another example, if the source of the resource record is a business entity, there may be a need to update the particular resource record to modify skills and/or rate information. The decision of whether a particular resource record should be updated can also be based upon a pre-determined time period from the record creation date (e.g., one year), such that only those resource records that have record creation dates of a year or more ago are updated. For example, the maintenance tool 295 can store a pre-determined time period for all resource records or for certain resource records, or different pre-determined time periods for different resource records. As an example, a different pre-determined time period can be used for different source types, or for different business entities.

If the maintenance tool 295 determines that a particular resource record should be updated based upon one or more factors, including the record creation date 260a, the maintenance tool 295 interfaces with the web server 120 to send an update request message 710 to the user. The update request message 710 can be sent as an e-mail message to the user's e-mail account or as a posted message on a dashboard that the user can view via the user browser 20 upon logging-in to the computer system. The update request message 710 can be sent per resource record or per user, such that if multiple resource records created by the same user need to be updated, the user can be provided only a single update request message 710 covering all resource records that need to be updated.

The maintenance tool 295 can further retrieve new or updated resource profile fields 220 (shown in FIG. 3) and/or new or updated resource rate fields 230 (shown in FIG. 3) not previously available to the user or not previously required to be filled out by the user. The update request message 710 sent to the user can inform the user that a new or updated field (220 or 230) is available or required to be filled out. The update message 710 can be sent to all users registered with the computer system 100 or to only those users who have a need to update their records 250 based on the new or updated field (220 or 230).

The maintenance tool 295 further coordinates the collection of any updated resource profile information and/or resource rate information 260b and/or 270b provided by the user. The updated resource profile information and/or resource rate information 260b and/or 270b can be entered by the user via the user browser 20 and web server 120 in the manner described above in connection with FIGS. 5A-5H and FIGS. 6A-6B. The updated resource profile information and/or resource rate information 260b and/or 270b can be entered by re-entering all of the resource profile information and/or resource rate information, or the user can be prompted to indicate the type of information the user would like to update (e.g., resource profile information or resource rate information), and in response, the computer system can push web pages to the user having resource profile selection data or resource rate selection data associated with only the information that the user would like to update. The updated resource profile information and/or resource rate information 260b and/or 270b can be specific to a particular resource record 250 or generic for multiple resource records 250 (e.g., if a business entity has changed benefit information for all employees, a benefit change can be made globally to all resource records associated with the business entity). Alternatively, the updated resource profile information and/or resource rate information 260b and/or 270b can merely indicate that no changes need to be made.

Upon receipt of the updated resource profile information and/or resource rate information 260b and/or 270b, the maintenance tool 295 is further responsible for storing the updated resource profile information and/or resource rate information 260b and/or 270b in the resource record 250 and updating the record creation date 260a. If the updated resource profile information and/or resource rate information 260b and/or 270b changes or modifies an existing table or field within the resource record 250, the maintenance tool 295 can replace any previously stored information 260b or 270b with the updated information 260b or 270b or store the updated information 260b or 270b in addition to the previously stored information within the resource record 250. If the latter, the current status of the previously stored information can be changed to "outdated." Alternatively, other notations can be included in the resource record to indicate the creation dates of the new information 260b or 270b and the old information.

The maintenance tool 295 further interfaces with the web server 120 to provide e-mail penalty messages 720 to the user if the user does not enter updated information 260b or 270b into the computer system 100. For example, if the user does not provide any updated information 260b or 270b, the maintenance tool 295 can provide an e-mail penalty message 720 (or penalty message 720 via dashboard) to the user informing the user that the user can no longer access the computer system 100 to obtain statistical data related to resource criteria.

Figure 18:
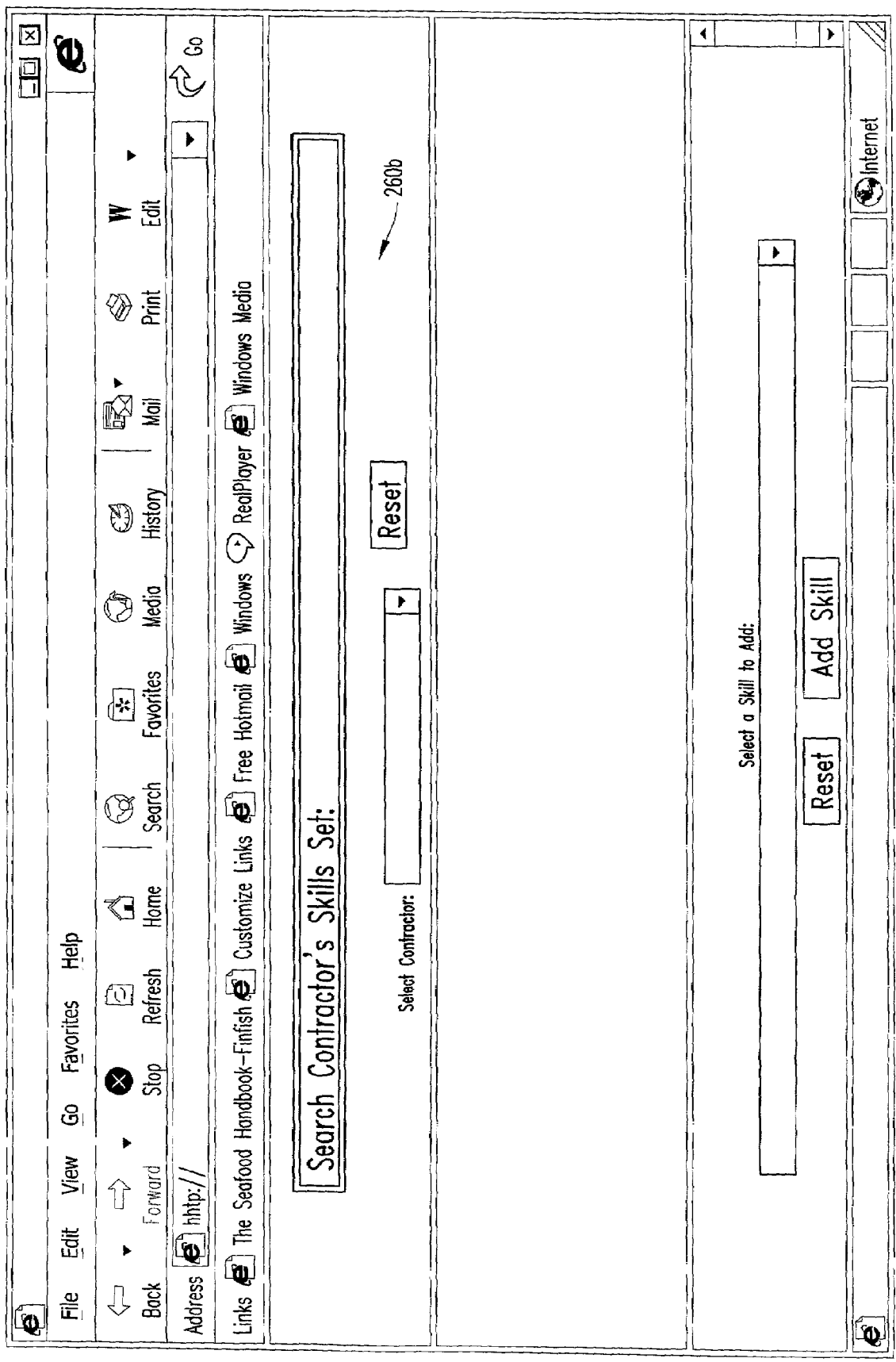
FIG. 18 is an exemplary screen shot illustrating a sample web page that can be displayed to update resource records.

FIG. 18 is an exemplary screen shot illustrating a sample web page that can be displayed to update resource records. As shown in FIG. 18, to update resource profile information 260b, a user can be provided a web page providing prompts to the user to select a particular resource record (e.g., "Select Contractor"), and to select a skill to add to the resource profile information 260b. Other types of prompts could also be provided to the user to remove a skill, remove or add a general function or otherwise modify any other resource profile information 260b stored in the resource record. In addition, further web pages (not shown) can be provided to the user to update the resource rate information 270b.

Figure 19:
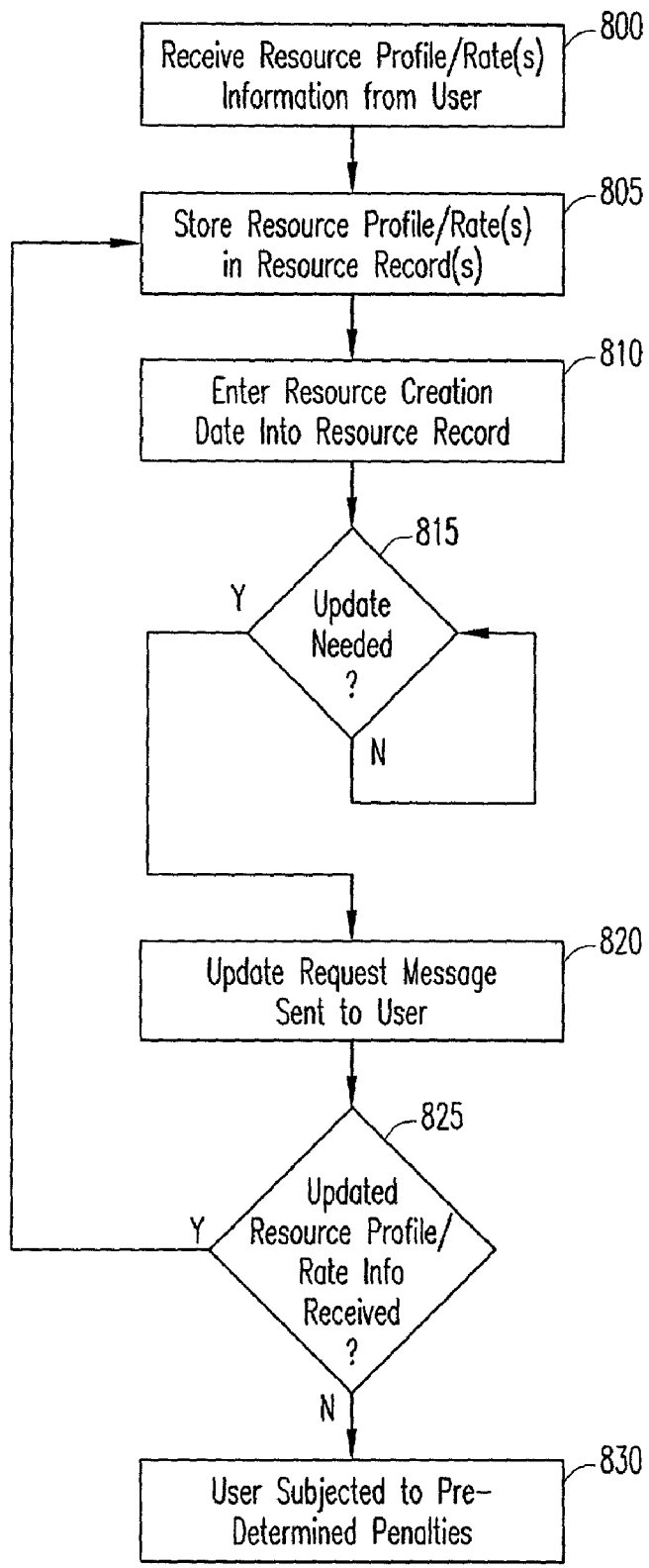

FIG. 19 is a flowchart illustrating exemplary steps for updating resource records, in accordance with embodiments of the present invention. When a user enters resource profile and resource rate information for the first time into the computer system or when a user provides updated resource profile or resource rate information to the computer system (step 800), the newly entered or updated resource profile and resource rate information is stored in a resource record (step 805). At the time the resource record is created or updated, the computer system further enters a record creation date into the resource record (step 810).

If the computer system determines that the resource record should be updated based upon the record creation date and/or other factors, as described above in connection with FIG. 17 (step 815), the computer system sends an update request message to the user requesting updated resource profile and/or resource rate information to remind the user to check the resource record to ensure the accuracy of the resource profile and/or resource rate information (step 820). If updated resource profile and/or resource rate information is entered by the user into the computer system prior to a pre-configured time period set by the computer system (step 825), the resource record is updated with the updated resource profile and/or resource rate information (step 830). However, if no updated resource profile and/or resource rate information is received by the computer system within the pre-configured time period set by the computer system (step 825), the user is subjected to pre-determined penalties dependent upon any agreement between the computer system and the user (step 830).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A method comprising:
   creating, via a computer processor, for each of a plurality of resources, a hierarchical resource profile having at least three tiers and comprising at least resource skills, industry, and experience;
   wherein, for each of the plurality of resources, the at least three tiers of the hierarchical resource profile comprise a first tier, a second tier, and a third tier, the first tier categorizing the hierarchical resource profile, the second tier categorizing the hierarchical resource profile within the first tier, and the third tier categorizing the hierarchical resource profile within the second tier;
   collecting, for each of the plurality of resources, resource rate information identifying at least compensation information and information regarding a source of the compensation information;
   assigning, for each of the plurality of resources, an integrity factor to the source of the resource rate information;
   associating, for each of the plurality of resources, said resource rate information and the integrity factor with the hierarchical resource profile to create a resource record;
   storing, for each of the plurality of resources, in a computer-readable medium, said resource record;
   wherein the storing step includes storing, for each of the plurality of resources, the hierarchical resource profile in a hierarchical and relational structure according to the at least three tiers; and performing, via the computer processor, a weighted statistical analysis of wage information associated with at least one of the plurality of resource records based, at least in part, on:
 at least one of resource skills, industry, and experience;
 a position of the at least one of the plurality of resource records in the at least three tiers; and
 wherein the statistical analysis is weighted, at least in part, based on the integrity factor.

2. The method of claim 1, wherein said step of creating said hierarchical resource profile comprises:
 providing, in a manner mirroring the at least three tiers, hierarchical profile selection data to a user to select from;
 receiving hierarchical profile selections selected from said hierarchical profile selection data from the user to define said hierarchical resource profile; and
 receiving skills selected from said hierarchical profile selection data from the user to associate said skills with said hierarchical resource profile.

3. The method of claim 2, further comprising:
 wherein the first tier corresponds to a business sector categorization, the second tier corresponds to a business arena categorization with the business sector categorization, and the third tier corresponds to a business family categorization within the business sector categorization; and
 wherein said hierarchical profile selections include a business sector selection, a business arena selection and a business family selection, said step of providing further comprising:
  providing business sector selection data including said business sector selection to the user;
  receiving said business sector selection from the user;
  determining business arena selection data associated with said business sector selection and providing said business arena selection data including said business arena selection to the user;
  receiving said business arena selection from the user;
  determining business family selection data associated with said business arena selection and providing said business family selection data including said business family selection to the user; and
  receiving said business family selection from the user.

4. The method of claim 2, further comprising:
 storing said hierarchical profile selection data in resource profile fields within a database in the hierarchical and relational structure according to the at least three tiers.

5. The method of claim 4, wherein said step of storing said resource profile information further comprises:
 storing resource profile information in fields within the database in the hierarchical and relational structure according to the at least three tiers, the hierarchical and relational structure mirroring select ones of said resource profile fields.

6. The method of claim 4, wherein said step of providing further comprises:
 providing said hierarchical profile selection data to the user via a scalable and configurable table-driven user interface.

7. The method of claim 6, wherein said step of providing further comprises:
 providing said hierarchical profile selection data to the user via a web-based user interface.

8. The method of claim 7, wherein said step of storing said hierarchical profile selection data further comprises:
 storing said hierarchical profile selection data within said resource profile fields within said database, said resource profile fields being organized in tables, each of said tables including said hierarchical profile selection data to be populated in a web page presented to the user via said web-based interface.

9. The method of claim 8, wherein said step of providing further comprises:
 pushing one or more web pages at a time to a web browser associated with the user, each of said one or more web pages being populated with said hierarchical profile selection data from one of said tables.

10. The method of claim 2, wherein said step of creating said hierarchical resource profile comprises:
 providing said hierarchical profile selection data as pre-configured resource profiles; and
 receiving said hierarchical profile selections and said skills as one of said pre-configured resource profiles.

11. The method of claim 2, wherein said skills include at least one general function selection identifying the level of skill associated with said three-tiered hierarchical resource profile, and wherein said step of providing comprises:
 providing general function selection data including said one or more general function selections to the user; and
 receiving said one or more general function selections selected from said general function selection data from the user.

12. The method of claim 2, wherein said skills comprise at least one skill category selection identifying the type of skills associated with the resource and said three-tiered hierarchical profile, said step of providing further comprising:
 providing skills category selection data including said one or more skills category selections to the user; and
 receiving said one or more skills category selections selected from said skills category selection data from the user.

13. The method of claim 12, wherein said skills further comprise skills sets selections identifying the experience that the resource possesses for each of said one or more skills category selections, said step of providing further comprising:
 providing skills sets selection data including said one or more skills sets selections for each of said skills category selections to the user; and
 receiving said one or more skills sets selections selected from said skills sets selection data from the user.

14. The method of claim 1, wherein said step of collecting said resource rate information further comprises:
 providing resource rate selection data to a user to select from;
 receiving said resource rate information selected from said resource rate selection data from the user.

15. The method of claim 14, further comprising:
 storing said resource rate selection data in resource rate fields within the database in a hierarchical and relational structure.

16. The method of claim 15, wherein said step of providing said resource rate selection data further comprises:
 providing said resource rate selection data to the user via a scalable and configurable table-driven user interface.

17. The method of claim 16, wherein said step of providing said resource rate selection data further comprises:
 providing said resource rate selection data to the user via a web-based user interface.

18. The method of claim 1, further comprising preventing a business-entity requestor from receiving statistical information unless resource rate information is provided by the business-entity requestor.

19. An article of manufacture for resource profiling and rate association, the article of manufacture comprising:
   at least one computer readable medium;
   processor instructions contained on the at least one computer readable medium, the processor instructions configured to be readable from the at least one computer readable medium by at least one processor and thereby cause the at least one processor to operate to perform at least the following steps:
      creating, for each of a plurality of resources, a hierarchical resource profile having at least three tiers and comprising at least resource skills, industry, and experience;
      wherein, for each of the plurality of resources, the at least three tiers of the hierarchical resource profile comprise a first tier, a second tier, and a third tier, the first tier categorizing the hierarchical resource profile, the second tier categorizing the hierarchical resource profile within the first tier, and the third tier categorizing the hierarchical resource profile within the second tier;
      collecting, for each of the plurality of resources, resource rate information identifying at least compensation information and information regarding the source of the compensation information;
   assigning, for each of the plurality of resources, an integrity factor to the source of the resource rate information;
      associating, for each of the plurality of resources, said resource rate information and the integrity factor with the hierarchical resource profile to create a resource record;
      storing, for each of the plurality of resources, in a computer-readable medium, said resource record;
   wherein the storing step includes storing, for each of the plurality of resources, the hierarchical resource profile in a hierarchical and relational structure according to the at least three tiers; and
   performing a weighted statistical analysis of wage information associated with at least one of the plurality of resource records based, at least in part, on:
      at least one of resource skills, industry, and experience;
      a position of the at least one of the plurality of resource records in the at least three tiers; and
      wherein the statistical analysis is weighted, at least in part, based on the integrity factor.

20. The article of manufacture of claim 19, wherein said step of creating said hierarchical resource profile comprises:
   providing, in a manner mirroring the at least three tiers, hierarchical profile selection data to a user to select from;
   receiving hierarchical profile selections selected from said hierarchical profile selection data from the user to define said hierarchical resource profile; and
   receiving skills selected from said hierarchical profile selection data from the user to associate said skills with said hierarchical resource profile.

21. The article of manufacture of claim 20, further comprising:
   wherein the first tier corresponds to a business sector categorization, the second tier corresponds to a business arena categorization with the business sector categorization, and the third tier corresponds to a business family categorization within the business sector categorization; and
   wherein said hierarchical profile selections include a business sector selection, a business arena selection and a business family selection, said step of providing further comprising:
      providing business sector selection data including said business sector selection to the user;
      receiving said business sector selection from the user;
      determining business arena selection data associated with said business sector selection and providing said business arena selection data including said business arena selection to the user;
      receiving said business arena selection from the user;
      determining business family selection data associated with said business arena selection and providing said business family selection data including said business family selection to the user; and
      receiving said business family selection from the user.

22. The article of manufacture of claim 20, wherein the processor instructions are further configured to cause the at least one processor to operate to perform at least the following step:
   storing said hierarchical profile selection data in resource profile fields within a database in the hierarchical and relational structure according to the at least three tiers.

23. The article of manufacture of claim 22, wherein said step of storing said resource profile information further comprises:
   storing resource profile information in fields within the database in a hierarchical and relational structure according to the at least three tiers, the hierarchical and relational structure mirroring select ones of said resource profile fields.

24. The article of manufacture of claim 22, wherein said step of providing further comprises:
   providing said hierarchical profile selection data to the user via a scalable and configurable table-driven user interface.

25. The article of manufacture of claim 24, wherein said step of providing further comprises:
   providing said hierarchical profile selection data to the user via a web-based user interface.

26. The article of manufacture of claim 25, wherein said step of storing said hierarchical profile selection data further comprises:
   storing said hierarchical profile selection data within said resource profile fields within said database, said resource profile fields being organized in tables, each of said tables including said hierarchical profile selection data to be populated in a web page presented to the user via said web-based interface.

27. The article of manufacture of claim 26, wherein said step of providing further comprises:
   pushing one or more web pages at a time to a web browser associated with the user, each of said one or more web pages being populated with said hierarchical profile selection data from one of said tables.

28. The article of manufacture of claim 20, wherein said step of creating said hierarchical resource profile comprises:
   providing said hierarchical profile selection data as pre-configured resource profiles; and
   receiving said hierarchical profile selections and said skills as one of said pre-configured resource profiles.

29. The article of manufacture of claim 20, wherein said skills at least one general function selection identifying the level of skill associated with said three-tiered hierarchical resource profile, and wherein said step of providing comprises:

providing general function selection data including said one or more general function selections to the user; and receiving said one or more general function selections selected from said general function selection data from the user.

30. The article of manufacture of claim 20, wherein said skills comprise at least one skill category selection identifying the type of skills associated with the resource and said three-tiered hierarchical profile, said step of providing further comprising:

providing skills category selection data including said one or more skills category selections to the user; and receiving said one or more skills category selections selected from said skills category selection data from the user.

31. The article of manufacture of claim 30, wherein said skills further comprise skills sets selections identifying the experience that the resource possesses for each of said one or more skills category selections, said step of providing further comprising:

providing skills sets selection data including said one or more skills sets selections for each of said skills category selections to the user; and receiving said one or more skills sets selections selected from said skills sets selection data from the user.

32. The article of manufacture of claim 19, wherein said step of collecting said resource rate information further comprises:

providing resource rate selection data to a user to select from;

receiving said resource rate information selected from said resource rate selection data from the user.

33. The article of manufacture of claim 32, wherein the processor instructions are further configured to cause the at least one processor to operate to perform at least the following step:

storing said resource rate selection data in resource rate fields within the database in a hierarchical and relational structure.

34. The article of manufacture of claim 33, wherein said step of providing said resource rate selection data further comprises:

providing said resource rate selection data to the user via a scalable and configurable table-driven user interface.

35. The article of manufacture of claim 34, wherein said step of providing said resource rate selection data further comprises:

providing said resource rate selection data to the user via a web-based user interface.

* * * * *

UNITED STATES PATENT AND TRADEMARK OFFICE
CERTIFICATE OF CORRECTION

PATENT NO. : 7,698,146 B2  
APPLICATION NO. : 10/128751  
DATED : April 13, 2010  
INVENTOR(S) : Andrew A. Cullen, III Page 1 of 1

It is certified that error appears in the above-identified patent and that said Letters Patent is hereby corrected as shown below:

Column 3, Line 50: insert --accordance with embodiments of the present invention-- after *in*

Column 5, Line 48: insert a --.-- after 10*f*

Signed and Sealed this
Eighth Day of May, 2012

David J. Kappos
*Director of the United States Patent and Trademark Office*